US009563877B2

(12) United States Patent
MacBeth et al.

(10) Patent No.: US 9,563,877 B2
(45) Date of Patent: Feb. 7, 2017

(54) CUSTOMIZABLE CONTROLS PROVIDED BY A MESSAGING APPLICATION FOR PERFORMING SELECTED ACTIONS

(75) Inventors: Melissa Rodden Morrell MacBeth, Seattle, WA (US); Ryan Edward Gregg, Redmond, WA (US); Jesse Clay Satterfield, Seattle, WA (US); Andrew Mark Coates, Redmond, WA (US); Kumiko Yada, Renton, WA (US); Richard P Grutzmacher, Seattle, WA (US); Michael Anthony Affronti, Seattle, WA (US); Owen C Braun, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 717 days.

(21) Appl. No.: 12/046,432

(22) Filed: Mar. 11, 2008

(65) Prior Publication Data

US 2009/0235196 A1 Sep. 17, 2009

(51) Int. Cl.
G06Q 10/10 (2012.01)
H04L 12/58 (2006.01)
G06F 9/44 (2006.01)
H04N 1/00 (2006.01)
G06Q 10/06 (2012.01)

(52) U.S. Cl.
CPC ............. *G06Q 10/107* (2013.01); *H04L 51/18* (2013.01); *G06F 8/33* (2013.01); *G06F 8/34* (2013.01); *G06Q 10/06311* (2013.01); *H04N 1/0097* (2013.01)

(58) Field of Classification Search
CPC .............................. G06Q 10/107; H04L 51/18
USPC .................................. 715/751, 765, 752, 837
See application file for complete search history.

(56) References Cited

U.S. PATENT DOCUMENTS 4,984,152 A * 1/1991 Muller .......................... 715/856
5,189,633 A * 2/1993 Bonadio ....................... 708/142
5,347,629 A * 9/1994 Barrett et al. ................ 715/762
(Continued)

FOREIGN PATENT DOCUMENTS

EP 1804153 A1 7/2007
JP 09258971 10/1997
(Continued)

OTHER PUBLICATIONS

Bing search q=export+email+rule&src=IE-SearchBox Jan. 25, 2016.*
(Continued)

*Primary Examiner* — Jeffrey A Gaffin
*Assistant Examiner* — John M Heffington
(74) *Attorney, Agent, or Firm* — Anand Gupta; Tom Wong; Micky Minhas

(57) ABSTRACT

Technologies are described herein for providing users of a messaging application with controls that perform one or more selected actions with a message. Any number of default custom action controls may be displayed in a gallery. The selection of a custom action control performs various actions to an active message. New custom action controls may be created and existing controls modified to provide any number of desired actions. Dialogs provide user-friendly interfaces that allow a user to assign the desired functionality to a custom action control. The custom action controls may be organized into groups and shared between messaging applications and computers.

17 Claims, 15 Drawing Sheets

(56) References Cited

U.S. PATENT DOCUMENTS

| | | | | |
|---|---|---|---|---|
| 5,619,636 | A * | 4/1997 | Sweat et al. | 715/202 |
| 5,623,592 | A * | 4/1997 | Carlson et al. | 715/866 |
| 5,648,824 | A * | 7/1997 | Dunn et al. | 725/88 |
| 5,723,803 | A * | 3/1998 | Kurakake | 84/637 |
| 5,736,985 | A * | 4/1998 | Lection et al. | 715/840 |
| 5,777,616 | A * | 7/1998 | Bates et al. | 715/837 |
| 5,870,091 | A * | 2/1999 | Lazarony et al. | 715/804 |
| 5,874,952 | A * | 2/1999 | Morgan | 715/835 |
| 5,929,851 | A * | 7/1999 | Donnelly | 715/762 |
| 5,987,498 | A * | 11/1999 | Athing et al. | 709/203 |
| 5,995,093 | A * | 11/1999 | Lambourne et al. | 715/716 |
| 5,995,101 | A * | 11/1999 | Clark et al. | 715/711 |
| 6,009,519 | A * | 12/1999 | Jones et al. | 713/1 |
| 6,014,688 | A * | 1/2000 | Venkatraman et al. | 709/206 |
| 6,014,689 | A * | 1/2000 | Budge et al. | 709/206 |
| 6,018,774 | A * | 1/2000 | Mayle et al. | 709/250 |
| 6,246,410 | B1 * | 6/2001 | Bergeron et al. | 715/854 |
| 6,262,729 | B1 * | 7/2001 | Marcos et al. | 715/744 |
| 6,275,935 | B1 * | 8/2001 | Barlow et al. | 713/182 |
| 6,335,738 | B1 * | 1/2002 | Englefield et al. | 715/744 |
| 6,335,745 | B1 * | 1/2002 | Amro et al. | 715/835 |
| 6,342,894 | B1 * | 1/2002 | Nojiri | 345/531 |
| 6,462,760 | B1 * | 10/2002 | Cox et al. | 715/835 |
| 6,469,722 | B1 * | 10/2002 | Kinoe et al. | 715/837 |
| 6,522,347 | B1 * | 2/2003 | Tsuji et al. | 715/848 |
| 6,594,032 | B1 * | 7/2003 | Hiroki et al. | 358/1.15 |
| 6,597,378 | B1 * | 7/2003 | Shiraishi et al. | 715/764 |
| 6,707,472 | B1 * | 3/2004 | Grauman | 715/752 |
| 6,823,495 | B1 * | 11/2004 | Vedula et al. | 715/805 |
| 6,851,089 | B1 * | 2/2005 | Erickson et al. | 715/255 |
| 6,904,568 | B2 | 6/2005 | Colgrove | |
| 6,965,926 | B1 * | 11/2005 | Shapiro et al. | 709/219 |
| 6,970,749 | B1 * | 11/2005 | Chinn et al. | 700/12 |
| 7,010,616 | B2 | 3/2006 | Carlson et al. | |
| 7,089,530 | B1 * | 8/2006 | Dardinski et al. | 717/105 |
| 7,096,465 | B1 * | 8/2006 | Dardinski et al. | 717/178 |
| 7,133,598 | B1 * | 11/2006 | Lin et al. | 386/232 |
| 7,159,192 | B2 | 1/2007 | Dobronsky | |
| 7,233,961 | B2 * | 6/2007 | Sampson | |
| 7,254,784 | B2 | 8/2007 | Chang | |
| 7,263,661 | B2 | 8/2007 | Chavers et al. | |
| 7,353,234 | B2 * | 4/2008 | Kimball | G06F 3/0481 |
| 7,480,863 | B2 * | 1/2009 | Branson | G06F 9/4446 715/711 |
| 7,506,260 | B2 * | 3/2009 | Wada | G06F 17/30899 715/700 |
| 7,555,721 | B2 * | 6/2009 | Wassom | G06F 3/0481 715/741 |
| 7,577,704 | B1 * | 8/2009 | Hegde | G06Q 10/10 709/205 |
| 7,614,007 | B2 * | 11/2009 | Chakravarty et al. | 715/772 |
| 7,669,125 | B2 * | 2/2010 | Smirnov | 715/705 |
| 7,827,157 | B2 * | 11/2010 | Shilo | G06F 17/3089 707/695 |
| 7,853,558 | B2 * | 12/2010 | Brindley | G06F 17/30038 707/608 |
| 7,886,011 | B2 * | 2/2011 | Buchheit | 709/206 |
| 7,925,716 | B2 * | 4/2011 | Zhang | G06Q 10/107 709/218 |
| 8,020,096 | B2 * | 9/2011 | Pagan | G06F 3/0238 715/711 |
| 8,205,172 | B2 * | 6/2012 | Wong | G06F 17/30884 715/704 |
| 8,375,325 | B2 * | 2/2013 | Wuttke | G06F 17/30899 715/764 |
| 8,417,357 | B2 * | 4/2013 | Husoy | G06F 9/4443 700/17 |
| 8,447,284 | B1 * | 5/2013 | Lee et al. | 455/414.3 |
| 8,479,097 | B2 * | 7/2013 | Husoy | G06F 9/4443 715/711 |
| 8,898,573 | B2 * | 11/2014 | Chang | G06F 17/30899 715/744 |
| 8,959,476 | B2 * | 2/2015 | Ramani | G06F 8/38 717/100 |
| 9,003,295 | B2 * | 4/2015 | Baschy | G06F 9/4443 715/741 |
| 9,003,296 | B2 * | 4/2015 | Murthy | G06F 9/4443 715/744 |
| 2002/0038347 | A1 * | 3/2002 | Maeda | 709/206 |
| 2002/0065818 | A1 | 5/2002 | Starr | |
| 2002/0091739 | A1 * | 7/2002 | Ferlitsch et al. | 707/526 |
| 2002/0118221 | A1 * | 8/2002 | Hudson et al. | 345/711 |
| 2002/0120543 | A1 * | 8/2002 | Brittingham et al. | 705/36 |
| 2002/0136373 | A1 * | 9/2002 | Togawa et al. | 379/93.24 |
| 2002/0152220 | A1 * | 10/2002 | Kang et al. | 707/101 |
| 2002/0194395 | A1 * | 12/2002 | Cutlip | 709/328 |
| 2003/0030664 | A1 * | 2/2003 | Parry | 345/744 |
| 2003/0051059 | A1 * | 3/2003 | Zondervan et al. | 709/250 |
| 2003/0063126 | A1 * | 4/2003 | Yanchar | G06F 3/0481 715/781 |
| 2003/0072488 | A1 * | 4/2003 | Barsness et al. | 382/181 |
| 2003/0103232 | A1 | 6/2003 | Twede | |
| 2003/0126136 | A1 * | 7/2003 | Omoigui | 707/10 |
| 2004/0034567 | A1 * | 2/2004 | Gravett et al. | 705/26 |
| 2004/0039950 | A1 * | 2/2004 | Okamoto et al. | 713/300 |
| 2004/0064473 | A1 | 4/2004 | Thomas | |
| 2004/0147280 | A1 * | 7/2004 | Kamiya | 455/550.1 |
| 2004/0150673 | A1 * | 8/2004 | Dobronsky | 345/810 |
| 2004/0153530 | A1 * | 8/2004 | Machida | 709/220 |
| 2004/0189699 | A1 * | 9/2004 | Dobronsky | 345/751 |
| 2004/0225715 | A1 * | 11/2004 | Gottfried | 709/204 |
| 2004/0239637 | A1 * | 12/2004 | Williams | G06F 3/0238 345/172 |
| 2004/0249890 | A1 * | 12/2004 | Fellenstein et al. | 709/206 |
| 2005/0039144 | A1 * | 2/2005 | Wada et al. | 715/840 |
| 2005/0039170 | A1 * | 2/2005 | Cifra et al. | 717/125 |
| 2005/0044502 | A1 * | 2/2005 | Fu | 715/734 |
| 2005/0055641 | A1 * | 3/2005 | Machida | 715/734 |
| 2005/0071771 | A1 * | 3/2005 | Nagasawa et al. | 715/765 |
| 2005/0114778 | A1 * | 5/2005 | Branson | G06F 9/4446 715/711 |
| 2005/0132072 | A1 * | 6/2005 | Pennell et al. | 709/228 |
| 2005/0160373 | A1 * | 7/2005 | Chakravarty et al. | 715/827 |
| 2005/0262481 | A1 * | 11/2005 | Coulson | G06F 9/4443 717/120 |
| 2006/0004836 | A1 * | 1/2006 | Dhingra | G06F 17/243 |
| 2006/0009243 | A1 * | 1/2006 | Dahan et al. | 455/466 |
| 2006/0045124 | A1 * | 3/2006 | Dahlstrom | H04L 63/0236 370/465 |
| 2006/0059136 | A1 * | 3/2006 | Wooldridge | G06F 17/30657 |
| 2006/0074735 | A1 * | 4/2006 | Shukla et al. | 705/8 |
| 2006/0100991 | A1 | 5/2006 | Hartel et al. | |
| 2006/0123341 | A1 * | 6/2006 | Smirnov | 715/708 |
| 2006/0123346 | A1 * | 6/2006 | Totman et al. | 715/748 |
| 2006/0143236 | A1 * | 6/2006 | Wu | G06F 17/30053 |
| 2006/0143607 | A1 | 6/2006 | Morris | |
| 2006/0167993 | A1 * | 7/2006 | Aaron et al. | 709/204 |
| 2006/0195411 | A1 | 8/2006 | Knight et al. | |
| 2006/0195797 | A1 * | 8/2006 | Yeung et al. | 715/811 |
| 2006/0206866 | A1 * | 9/2006 | Eldrige et al. | 717/122 |
| 2006/0212830 | A1 * | 9/2006 | Fogg | 715/835 |
| 2006/0212831 | A1 * | 9/2006 | Fogg | 715/835 |
| 2006/0242587 | A1 * | 10/2006 | Eagle et al. | 715/747 |
| 2006/0253787 | A1 * | 11/2006 | Fogg | 715/752 |
| 2006/0254862 | A1 * | 11/2006 | Hoersten | 186/52 |
| 2006/0259262 | A1 * | 11/2006 | Kuehnrich | 702/104 |
| 2006/0282795 | A1 * | 12/2006 | Clark | G06Q 10/10 715/840 |
| 2007/0016860 | A1 | 1/2007 | Lim | |
| 2007/0043866 | A1 * | 2/2007 | Garbow et al. | 709/226 |
| 2007/0087766 | A1 * | 4/2007 | Hardy et al. | 455/466 |
| 2007/0130369 | A1 | 6/2007 | Nayak | |
| 2007/0143662 | A1 * | 6/2007 | Carlson | G06F 9/4443 715/207 |
| 2007/0157097 | A1 * | 7/2007 | Peters | 715/764 |
| 2007/0157118 | A1 | 7/2007 | Wuttke | |
| 2007/0189708 | A1 * | 8/2007 | Lerman et al. | 386/52 |
| 2007/0233751 | A1 * | 10/2007 | Sampson | 707/201 |
| 2007/0283279 | A1 | 12/2007 | Barnes | |
| 2008/0117933 | A1 * | 5/2008 | Castiglione et al. | 370/487 |
| 2008/0126994 | A1 * | 5/2008 | Park et al. | 715/847 |

(56) References Cited

U.S. PATENT DOCUMENTS

| | | | |
|---|---|---|---|
| 2008/0134084 A1* | 6/2008 | Clark | G06Q 10/10 715/808 |
| 2008/0178073 A1* | 7/2008 | Gao | G06F 17/24 715/243 |
| 2008/0201386 A1* | 8/2008 | Maharajh | G06F 17/30035 |
| 2008/0243548 A1* | 10/2008 | Cafer | 705/3 |
| 2008/0280588 A1* | 11/2008 | Roundtree et al. | 455/405 |
| 2008/0300697 A1* | 12/2008 | Moriat et al. | 700/39 |
| 2008/0320403 A1* | 12/2008 | Glaberson | 715/763 |
| 2009/0048915 A1* | 2/2009 | Chan | G06Q 30/02 705/14.64 |
| 2009/0083710 A1* | 3/2009 | Best | G06F 9/4446 717/120 |
| 2009/0125544 A1* | 5/2009 | Brindley | G06F 17/30038 |
| 2009/0172635 A1* | 7/2009 | Auriemma et al. | 717/107 |
| 2009/0228804 A1* | 9/2009 | Kim | G06F 17/30861 715/745 |
| 2009/0313565 A1* | 12/2009 | Kohei | 715/765 |

FOREIGN PATENT DOCUMENTS

| | | | | |
|---|---|---|---|---|
| JP | 2000-040042 | A | 8/2000 | |
| JP | 2001-227490 | A | 8/2001 | |
| JP | 2002-304245 | A | 10/2002 | |
| JP | 2003-288182 | A | 10/2003 | |
| JP | 2007-011858 | A | 1/2007 | |
| JP | 5044652 | B2 * | 10/2012 | G06F 17/30899 |
| KR | 20080024617 | A * | 3/2008 | G06F 17/30899 |
| KR | WO 2008032954 | A1 * | 3/2008 | G06F 17/30899 |
| KR | 100820373 | B1 * | 4/2008 | G06F 17/30899 |

OTHER PUBLICATIONS

Bing search q=import%20email%20rule&qs=n&form=QB Jan. 25, 2016.*
MacLean et al., "User-Tailorable Systems: Pressing the Issues with Buttons", CHI'90 Proceedings, Apr. 1990, ACM, 1990, pp. 175-182.
Dourish, "Evolution in the Adoption and Use of Collaborative Technologies", Position paper for the ECSCW'99 Workshop on Evolving Use of Groupware, Copenhagen, Sep. 1999, pp. 4.
"To customize the Microsoft Outlook toolbar", Slipstick Systems, pp. 3.
"To customize the Microsoft Outlook toolbar", Slipstick Systems, downloaded Dec. 31, 2007 from http://www.slipsrtick.com/outlook/toolbar.htm, 3 Pages.
Russian Official Action dated Nov. 6, 2012 in Russian Application No. 2010137831.
"Is it impossible to survive when it is impossible to use Linux? Introduction to Linux which is the easiest to understand in Japan," Network Magazine, vol. 12, No. 4, p. 111, ASCII Corporation, Japan, Mar. 1, 2007.
Japanese Official Action dated Feb. 5, 2013 in Japanese Application No. 2010-550708.
Chinese Official Action dated Mar. 20, 2012 in Chinese Application No. 200980108827.1.
Japanese Official Office Action dated Jun. 25, 2013 in Japanese Application No. 2010-550708.
Russian Notice of Allowance dated Jul. 11, 2013 in Russian Application No. 2010137831/08(053855).
Toshihiko Okazaki, "Verifying Windows XP Which is Soon to be Completed, Part 2," PC Style 21, vol. 2, No. 10, pp. 140 to 145, Mainichi Communications Inc., Japan, Sep. 20, 2001.
European Search Report dated Aug. 31, 2012 in European Application No. 09720917.5.
Chinese Official Action dated Oct. 11, 2013 in Chinese Application No. 200980108827.1.
Japanese Official Action dated Nov. 19, 2013 in Japanese Application No. 2010-550708.
Chinese Official Action dated Nov. 28, 2012 in Chinese Application No. 200980108827.1.
Chinese Official Action dated Apr. 28, 2013 in Chinese Application No. 200980108827.1.
Abstract TW 200644374 published Dec. 16, 2006 entitled Operation control device and method for a plurality of electric power consuming systems, program and memory medium thereof, in the name of Katsunori et al., 3 pp.
Abstract TW I264234 published Oct. 11, 2006 entitled Wireless terminal device and program for controlling receiving operation of the same, in the name of Yoshiharu et al., 4 pp.
Taiwan Official Action dated Aug. 21, 2014 in Taiwanese Application No. 98105028.
European Official Action dated May 7, 2014 in European Application No. 09720917.5.
Chinese Official Action dated Apr. 21, 2014 in Chinese Application No. 200980108827.1.
Korean Office Action mailed Aug. 31, 2015 for Korean patent application No. 10-2010-7022266, a counterpart foreign application of U.S. Appl. No. 12/046,432, 4 pages.
The European Office Action mailed Feb. 1, 2016 for European Patent Application No. 09720917.5, a counterpart foreign application of U.S. Appl. No. 12/046,432, 4 pages.
The European Office Action mailed May 20, 2016 for European Patent Application No. 09720917.5, a counterpart foreign application of U.S. Appl. No. 12/046,432, 3 pages.
The Korean Office Action mailed Mar. 31, 2016 for Korean patent application No. 10-2010-7022266, a counterpart foreign application of U.S. Appl. No. 12/046,432.
The Korean Office Action mailed Jan. 21, 2015 for Korean patent application No. 10-2010-7022266, a counterpart foreign application of U.S. Appl. No. 12/046,432, 5 pages.

* cited by examiner

CUSTOMIZABLE CONTROLS PROVIDED BY A MESSAGING APPLICATION FOR PERFORMING SELECTED ACTIONS

BACKGROUND

Messaging applications such as electronic mail (e-mail) programs often provide features that allow users to manipulate and organize messages. As an example, e-mail programs may allow a user to not only reply to and forward e-mail, but also to move e-mail to specific folders, flag e-mail, and to mark e-mail as read or unread. However, to utilize many of these features, a user must often take multiple steps, such as dragging and dropping e-mail into an appropriate folder or clicking on a button that reveals further options, which must then be selected to complete the desired function.

For example, to flag, forward, and move an e-mail, a user would typically need to select the e-mail, select a button that attaches a flag to the e-mail, select a forwarding button, select or type a desired forwarding address, type a desired message, select a send button, and then drag and drop the flagged message into a desired folder. Often these same actions are performed repeatedly as e-mails with similar subject matter are received. Manually performing multiple actions on e-mails takes excessive time that decreases work efficiency.

It is with respect to these considerations and others that the disclosure made herein is presented.

SUMMARY

Technologies are described herein for performing user-defined actions on a message upon receiving a selection of a custom actions control. In particular, utilizing the various embodiments described herein, a messaging application may display a custom actions control in a gallery. When selected by a user, the messaging application performs any number of simultaneous or sequential actions to an active message. The custom actions control is customizable, allowing the user to define the actions to be performed upon selection of the control. Any number of custom action controls may be created and customized by the user and placed in the gallery proximate to the messages for convenient use. The custom action controls allow the user to efficiently organize messages and take one or more desired actions with a single input, significantly increasing efficiency and enhancing the user's experience with the messaging application.

According to one aspect presented herein, a request to customize a custom action control is received. As a result, a dialog is provided that includes various actions that may be performed when the custom action control is selected. The user selects the desired actions, which are then associated with the custom action control. The new custom action control is then provided in a gallery near the window containing messages.

According to yet another aspect presented herein, a gallery of custom action controls is provided next to a message window. Upon receiving a selection of a manage custom actions control in the gallery, a dialog is provided to the user. The dialog includes a preview of the custom action controls and a number of selectable controls for modifying the custom action controls in the gallery. When a control for modifying the custom action controls is selected, then the corresponding custom action controls are modified accordingly. According to various embodiments, the custom action controls may be accessible to multiple messaging applications and may be exported via e-mail or saved to a file for subsequent sharing.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
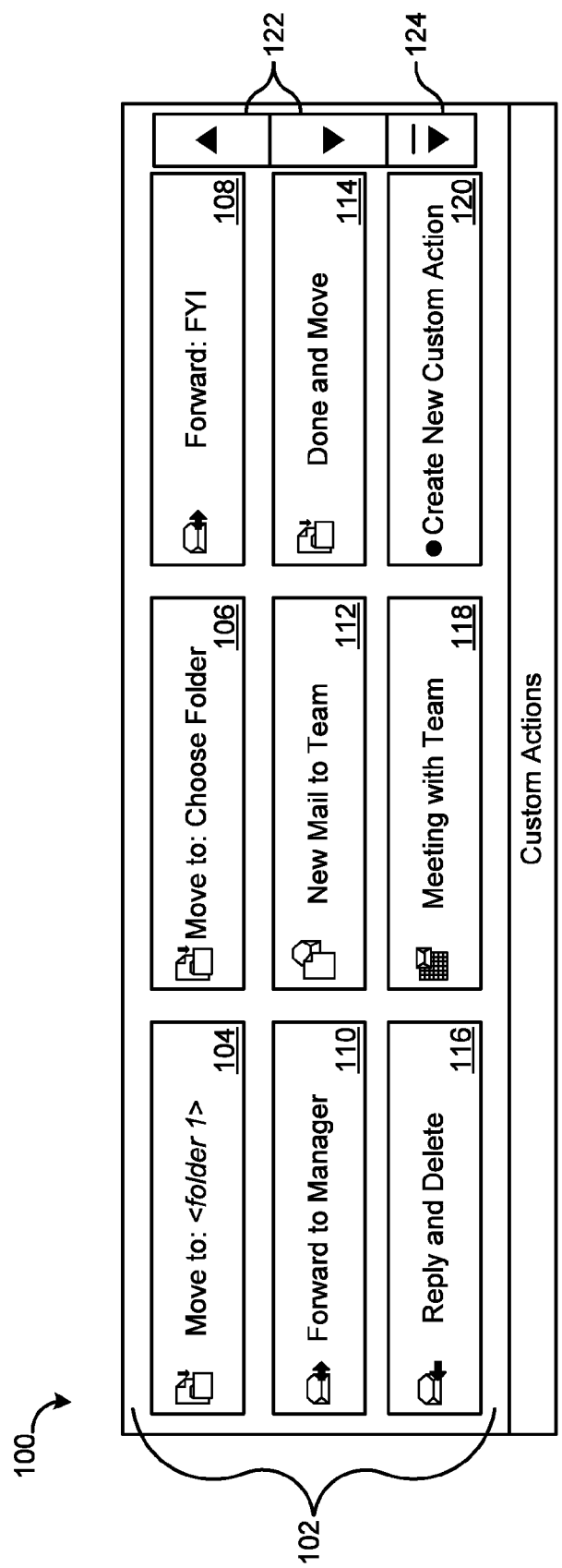
FIG. 1 is a screen diagram showing a custom actions gallery that includes default custom action controls according to various embodiments presented herein.

The following detailed description is directed to technologies for providing users of messaging applications with the ability to perform multiple actions with messages by selecting a single button. Through the use of the technologies and concepts presented herein, a user can customize, add, and delete any number of buttons displayed in a gallery to enable multiple combinations of actions to be applied to a message with a single click of the appropriate button.

Throughout this disclosure, the various embodiments will be described in the context of an e-mail application such as MICROSOFT OFFICE OUTLOOK by MICROSOFT CORPORATION of Redmond, Wash. However, it should be appreciated that the embodiments described below are equally applicable to any type of messaging application and are not limited to e-mail applications. Additionally, the disclosure herein is discussed in the context of a message or e-mail. It should be understood that "message" includes e-mail and any other actionable items provided by a messaging application, including but not limited to actions associated with contacts, tasks, and calendars.

As discussed briefly above, e-mail provides an important function for most people in their personal and professional lives. While a large number of people utilize e-mail in their daily lives, the manner in which e-mail is used and organized may vary greatly from person to person. Many people organize received e-mail into folders that correspond to the subject matter of the e-mail, the sender of the e-mail, or any other type of desired classification. Others allow received e-mail to pile up in their inbox. Often, users will perform multiple actions with an e-mail after receiving it. For example, some people will flag an e-mail for follow up, mark it as "read," set a priority, and move it into an applicable folder. People working on a work team may find themselves repeatedly forwarding e-mails to the other members of the team. The team members might even repeatedly use the same text when forwarding e-mails, such as "please review and comment."

Utilizing the concepts presented herein, users are able to create custom buttons, that when selected with a single click of a mouse, will perform a specific set of user-defined actions. Applying the disclosure provided herein to the examples discussed above, a user may create a custom action button that when clicked, flags a selected e-mail for follow up, marks it as "read," marks it as high priority, and moves it into a reference folder. Similarly, a custom action button may be created that when clicked, forwards a selected e-mail to all of the members of a particular work team along with the message, "please review and comment." Throughout this disclosure, the term "control" may be utilized to represent a button, icon, shortcut key or key combination, or any other element that when selected or entered, is operative to initiate logic to perform the actions assigned to the control.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing custom action controls will be described.

Turning now to FIG. 1, a custom actions gallery 100 will be described. According to one embodiment, the custom actions gallery 100 is an area of a user interface provided by an e-mail application that is positioned in a convenient location, such as adjacent to a window that displays one or more e-mails. The custom actions gallery 100 may be located in a ribbon, such as the ribbons provided in MICROSOFT OFFICE products by MICROSOFT CORPORATION of Redmond, Wash. However, it should be appreciated that the custom action controls 102 could be displayed within any gallery at any location and is not limited to being located in the ribbon. The custom actions gallery 100 may include any number of custom action controls 102. Although FIG. 1 shows nine custom action controls 102 within the custom actions gallery 100, the number of custom action controls 102 within the gallery is limited only by the maximum size of the custom actions gallery 100.

Scroll controls 122 allow a user to scroll down to reveal additional custom action controls 102 if the number of available custom action controls 102 is greater than the number that will fit within the custom actions gallery 100. Moreover, according to various embodiments, selecting an expand control 124 triggers an expansion of the custom actions gallery 100 to an expanded custom actions gallery that shows all of the available custom action controls 102, organized into groups, if applicable. The expanded custom actions gallery will be described below with respect to FIG. 3.

When the e-mail application is first loaded, the custom actions gallery 100 may be populated with default custom action controls 102. FIG. 1 shows nine default controls. According to one embodiment, the e-mail application pre-selects a folder corresponding to the "Move" control 104. Any logic may be used to pre-select the folder to be assigned to the "Move" control 104. As an example, one embodiment utilizes the following logic in pre-selecting a folder for the "Move" control 104:

If the most recently used folder list is populated,
   then use the first folder in the most recently used folder list.
Else if: the folder list contains mail folders other than the system folders below the Inbox,
   use the first folder in alphabetical order that appears under the Inbox.
Else if: the folder list contains mail folders outside the Inbox (not system folders),
   use the first folder outside of the Inbox in alphabetical order.
Else, (the user only has system folders)
   Display the first use dialog when the control is used.

The first use dialog, if triggered according to the folder pre-select logic, requests user input for assigning a folder to the "Move" control 104. It should be understood that any set of rules may be utilized to pre-select the folder assigned to the "Move" control 104. Unlike the "Move" control 104, the "Move" control 106 triggers a first use dialog to allow the user to specify a folder to assign to the control. After the folder has been pre-selected with respect to the "Move" control 104 or specified with respect to the "Move" control 106, subsequent selection of either control will automatically move the active e-mail to the corresponding folder. For the purposes of this disclosure, the active e-mail is the e-mail that is currently selected or highlighted. Additionally, the name and label of the "Move" control 104 and the "Move" control 106 may be updated to reflect the selected folder. This name change may occur using predefined logic or through input from the user.

Figure 2:
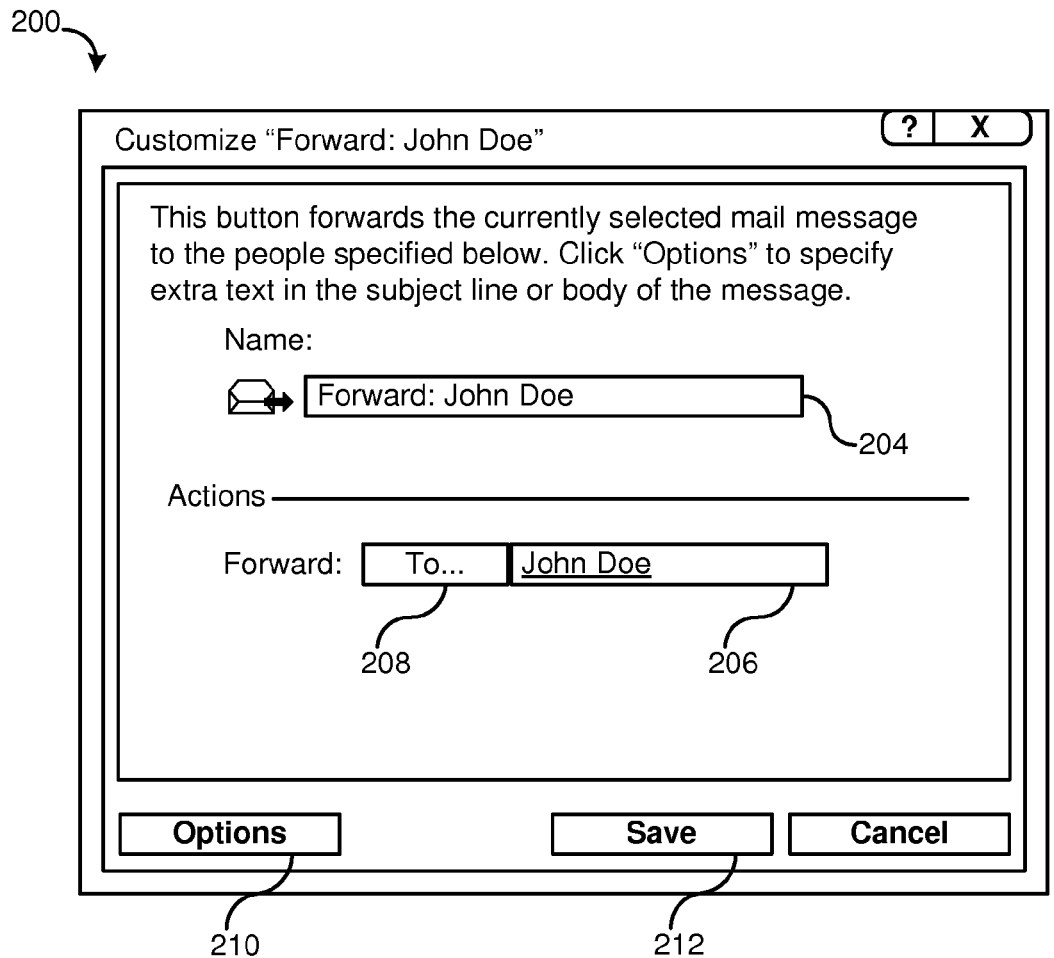
FIG. 2 is a screen diagram showing a first use dialog according to various embodiments presented herein.

The "Forward: FYI" control 108 launches a forward dialog of the e-mail and adds "FYI" to the subject and to the body of the e-mail. The user may then select a recipient and send the e-mail. The first time it is used, the "Forward to Manager" control 110 will trigger a first use dialog. A sample first use dialog 200 is shown in FIG. 2. The first use dialog 200 contains specific fields corresponding to the type of custom action control that is being customized. For the purposes of this disclosure, the term "customize" includes creating a new custom action control 102 and editing an existing custom action control 102. The first use dialog 200 shown in FIG. 2 shows an example of a dialog for customizing a "Forward" custom action control. The first use dialog 200 includes a name field 204 for receiving a custom name for the corresponding custom action control 102 and a recipient field 206 for receiving the e-mail address, or corresponding identification from an address book that is associated with an e-mail address, of the intended recipient(s). A "To" control 208 triggers a browse dialog through which the user may select one or more recipients.

According to one embodiment, when the first use dialog 200 is triggered for the "Forward to Manager" control 110, the name field 204 and the recipient field 206 will be pre-populated with information associated with the user's manager. The identity of the user's manager, as well as the corresponding e-mail address, may be looked up by the e-mail application in a global address book utilizing the title of "manager," "supervisor," or other similar title if the e-mail application has access to an organizational chart and address book or similar means for identifying managers, peers, and subordinates. One example includes an e-mail application utilizing an Exchange system. With the name field 204 and the recipient field 206 pre-populated with information associated with the user's manager, the user may simply select the "Save" control 212 to save the actions associated with the "Forward to Manager" control 110, or may change the pre-populated information prior to saving. It should be noted that the name of the "Forward to Manager" control 110 may then be changed to "Forward to John Doe" or whatever name is pre-populated or selected in the name field 204.

The "Options" control 210 may be selected to insert text that will be included with the forwarded e-mail every time that the "Forward to Manager" control 110 is selected. According to various embodiments, once the "Forward to Manager" control 110 is configured utilizing the first use dialog 200, subsequent selection of the "Forward to Manager" control 110 will trigger an automatic forwarding of the active e-mail to the user's manager along with any text input into the first use dialog 200. Alternatively, selecting the "Forward to Manager" control 110 will open a forwarding dialog that has the manager's information pre-populated. The user may then type any desired text and send the e-mail.

It should be understood that the first use dialog 200 may only be launched for those custom action controls 102 that perform actions having a default selection. For example, moving an e-mail to a folder and sending an e-mail would have a folder selection and a recipient selection that benefits from the user's initial configuration. In contrast, the first selection of the "Forward: FYI" control 108 would not trigger a first use dialog 200 since the control creates a forward dialog for the e-mail and adds "FYI" to the subject and to the body of the e-mail. The user then selects a recipient and sends the e-mail. No default selections are associated with this type of control. It should be appreciated that any of the default controls can be further customized through the selection of the "Options" control 210, which allows for the selection of additional actions. The default controls may also be deleted, renamed, and duplicated without having been used via a right click menu shown in FIG. 11 and described below.

Returning to FIG. 1, a "New Mail to Team" control 112 operates similar to the "Forward to Manager" control 110 described above. The difference is that the "New Mail to Team" control 112 triggers a new e-mail dialog that is pre-populated with the identities and e-mail addresses of members of the user's work team. This information may be looked up in an Exchange system as described above and/or configured by the user using the first use dialog 200. A "Done and Move" control 114, when selected, moves an e-mail to a specified folder and marks it as complete. The folder may be specified utilizing the first use dialog 200 as described above. A "Reply and Delete" control 116 opens a reply dialog and deletes the received e-mail.

A "Meeting with Team" dialog 118 opens a meeting request dialog that is pre-populated with the identities and e-mail addresses of the other members of the user's team. The members of a particular work team may be identified and associated with the "Meeting with Team" dialog 118 in a similar manner as that described above with respect to identifying a user's manager to associate with the "Forward to Manager" control 110. Finally, a "Create New Custom Action" control 120 launches a new/edit dialog used to create a new custom action control 102. The new/edit dialog will be discussed in further detail below with respect to FIGS. 7-9. After the new custom action control 102 is created, it is placed in the gallery. The "Create New Custom Action" control 120 remains in the custom actions gallery 100.

It should be understood that the default custom action controls 102 that are included in the custom actions gallery 100 when the e-mail application is first loaded and launched are not limited to those shown and described with respect to FIG. 1. Any number and type of custom action controls 102 may be included as default controls. Any number and type of actions that may be performed by the e-mail application may be combined in any desired manner to create a custom action control 102. Additionally, as will be discussed below, in addition to providing the user with an opportunity to create new custom action controls 102, the concepts disclosed herein also provide for the customization of any of the default custom action controls 102 that are displayed in the custom actions gallery 100 when the e-mail application is first loaded and launched.

Figure 3:
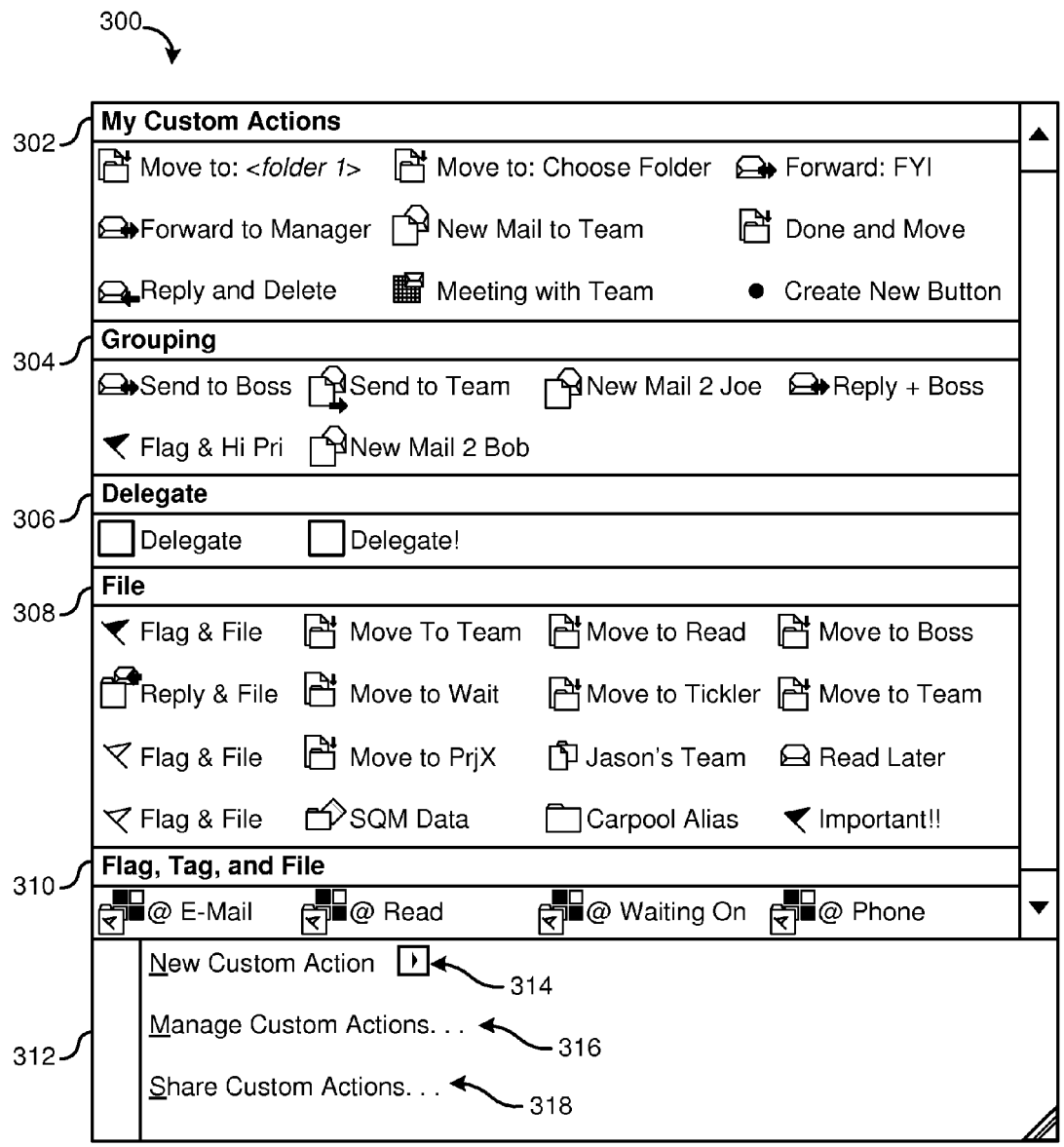
FIG. 3 is a screen diagram showing an expanded custom actions gallery according to various embodiments presented herein.

As stated above, the selection of the expand control 124 triggers an expansion of the custom actions gallery 100 to an expanded custom actions gallery 300, as shown in FIG. 3. According to one embodiment, the expanded custom actions gallery 300 includes all of the custom action controls 102, both the default custom action controls 102 and the user-created custom action controls 102, available to the user. The expanded custom actions gallery 300 may display the custom action controls 102 in groups or categories, separated by group headings 302, 304, 306, 308, and 310. The groups may be created using a manage custom actions dialog described below with respect to FIG. 6. It should be appreciated that the groups shown in the expanded custom actions gallery 300 of FIG. 3 are for illustrative purposes only and are not intended to limit the present disclosure. Any number and type of groups may be created. As a further example, a "Favorites" group may be created that is populated with the most commonly used custom action controls 102 and displayed in the custom actions gallery 100.

The expanded custom actions gallery 300 may also include a command section 312 that includes any number of controls for further creating, editing, managing, sharing, and otherwise manipulating custom action controls 102. According to one embodiment, the command section 312 includes a "New Custom Action" control 314, a "Manage Custom Actions" control 316, and a "Share Custom Actions" control 318, each of which will be described in further detail below.

Figure 4:
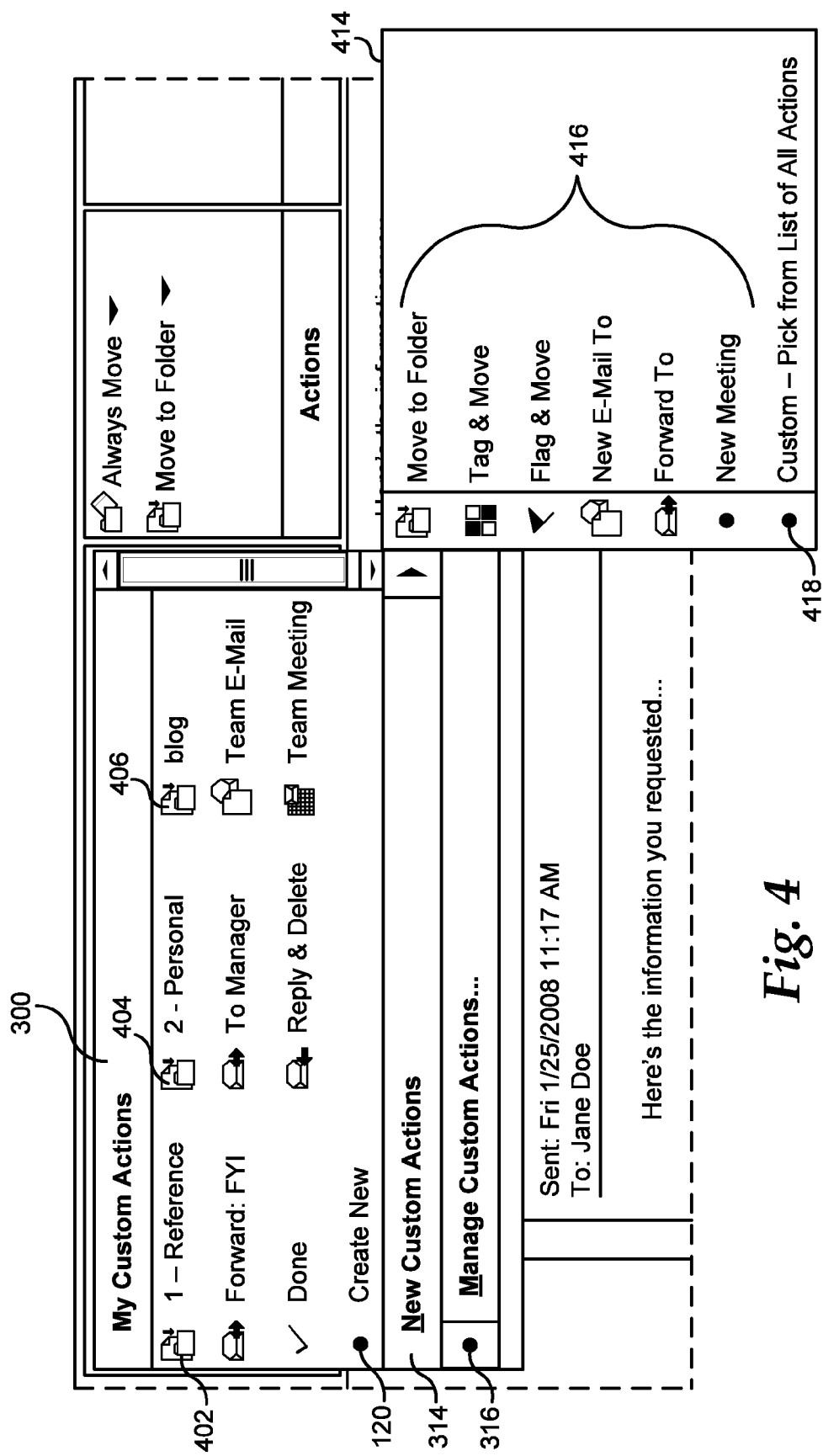
FIG. 4 is a screen diagram showing a custom actions gallery and a new custom actions flyout menu according to various embodiments presented herein.

Turning now to FIG. 4, a screen diagram showing a portion of an illustrative window of an e-mail application will be described. In this example, the custom actions gallery 100 has been expanded to create the expanded custom actions gallery 300. The expanded custom actions gallery 300 shows that the user has created three new custom action controls 402, 404, and 406, corresponding to moving e-mail to a reference folder, a personal folder, and a blog folder, respectively. In the example shown, the command section of the expanded custom actions gallery 300 includes a "New Custom Action" control 314 and a "Manage Custom Actions" control 316. Selecting the "Manage Custom Actions" control 316 launches a manage custom actions dialog, which will be discussed below with respect to FIG. 6. According to the example shown here, selecting the "New Custom Action" control 314 displays a flyout menu 414. The flyout menu 414 includes template controls 416 for creating and customizing new custom action controls 102 using templates provided by the e-mail application and a "Custom" control 418 for launching the new/edit dialog described below. The templates launched from a selection of the template controls 416 are based on common custom actions.

Figure 5:
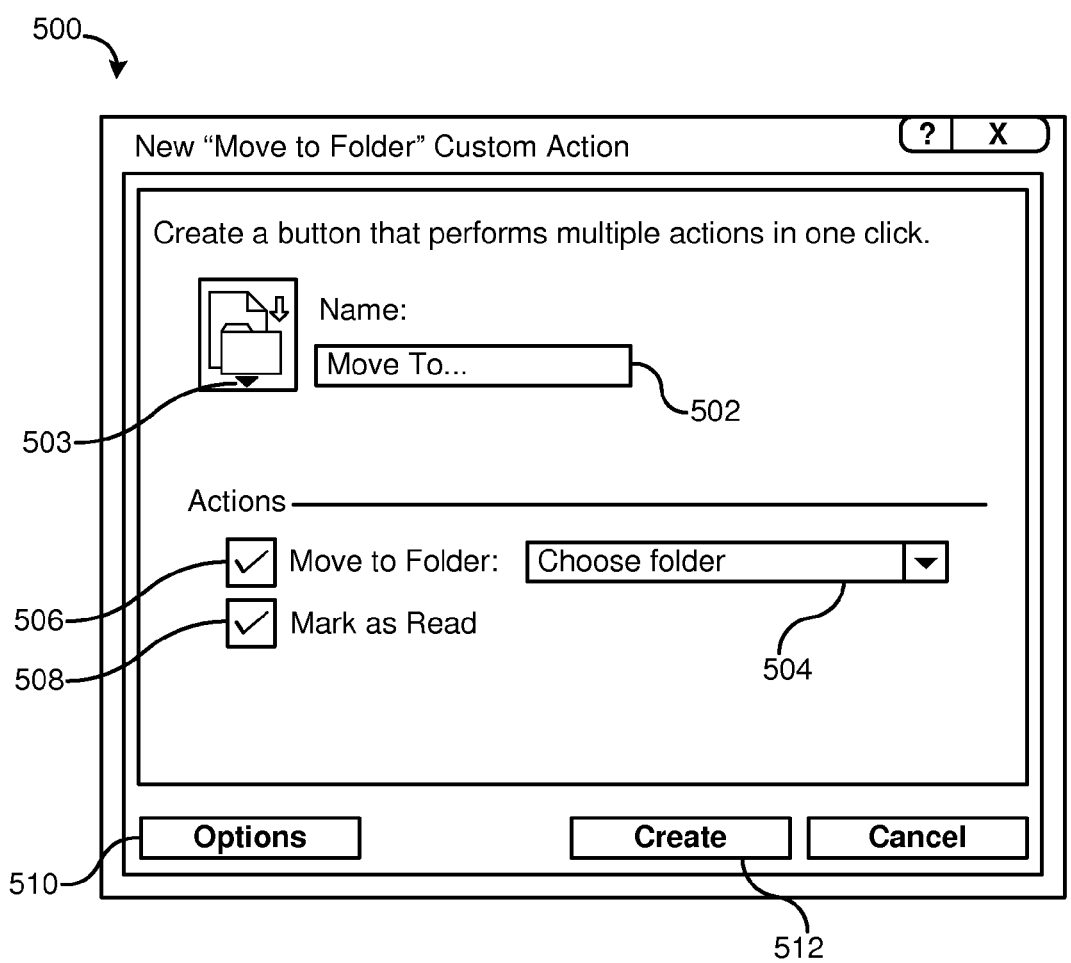
FIG. 5 is a screen diagram showing a template dialog according to various embodiments presented herein.

As an example, to create a new custom action control 102 that will move an e-mail to a designated folder and mark the e-mail as read, the user may select the "New Custom Action" control 314 from the expanded custom actions gallery 300 to launch the flyout menu 414. Alternatively, the e-mail application may launch the flyout menu 414 after detecting that the cursor is hovering over the "New Custom Action" control 314. From the flyout menu 414, the user selects the template control 416 corresponding to "Move to Folder." This action launches the template dialog 500 shown in FIG. 5.

The template dialog 500 provides a name field 502 for receiving text that identifies the new custom action control 102. A folder input field 504 allows for the selection of the folder to which e-mail will be moved upon selection of the new custom action control 102. It should be noted that the name of the control may be suggested by the messaging application using the name of the folder, but the user may change the name of the control as desired. An icon selection control 503 may be used to select a desired icon to be associated with the corresponding control. The icon may be preselected by the messaging application according to the type of custom action control 102 being customized. The user may select the icon selection control 503 to allow for a drop-down menu of icons from which to choose from, or to enable a "browse" functionality that enables the user to navigate to a particular location on the computer or network from which to retrieve a desired icon.

The template dialog 500 is pre-populated with common actions. In this example, checkboxes 506 and 508 allow the user to select and deselect the "Move to Folder" action and the "Mark as Read" action, respectively. To further customize the new custom action control 102 with additional actions, the user may select the "Options" control 510, which will launch the new/edit dialog discussed below with respect to FIG. 8.

When complete, the user may select the "Create" control 512 to associate the selected actions with the new custom action controls 102 that will appear in the expanded custom actions gallery 300 with the name designated in the name field 502 of the template dialog 500. It should be appreciated that the template dialog 500 and the first use dialog 200 for a given custom action control 102 may be identical. There may be template dialogs 500 corresponding to contemplated custom action controls 102 that are not default custom action controls 102 shown in the expanded custom actions gallery 300 at the first load and launch of the e-mail application.

Figure 6:
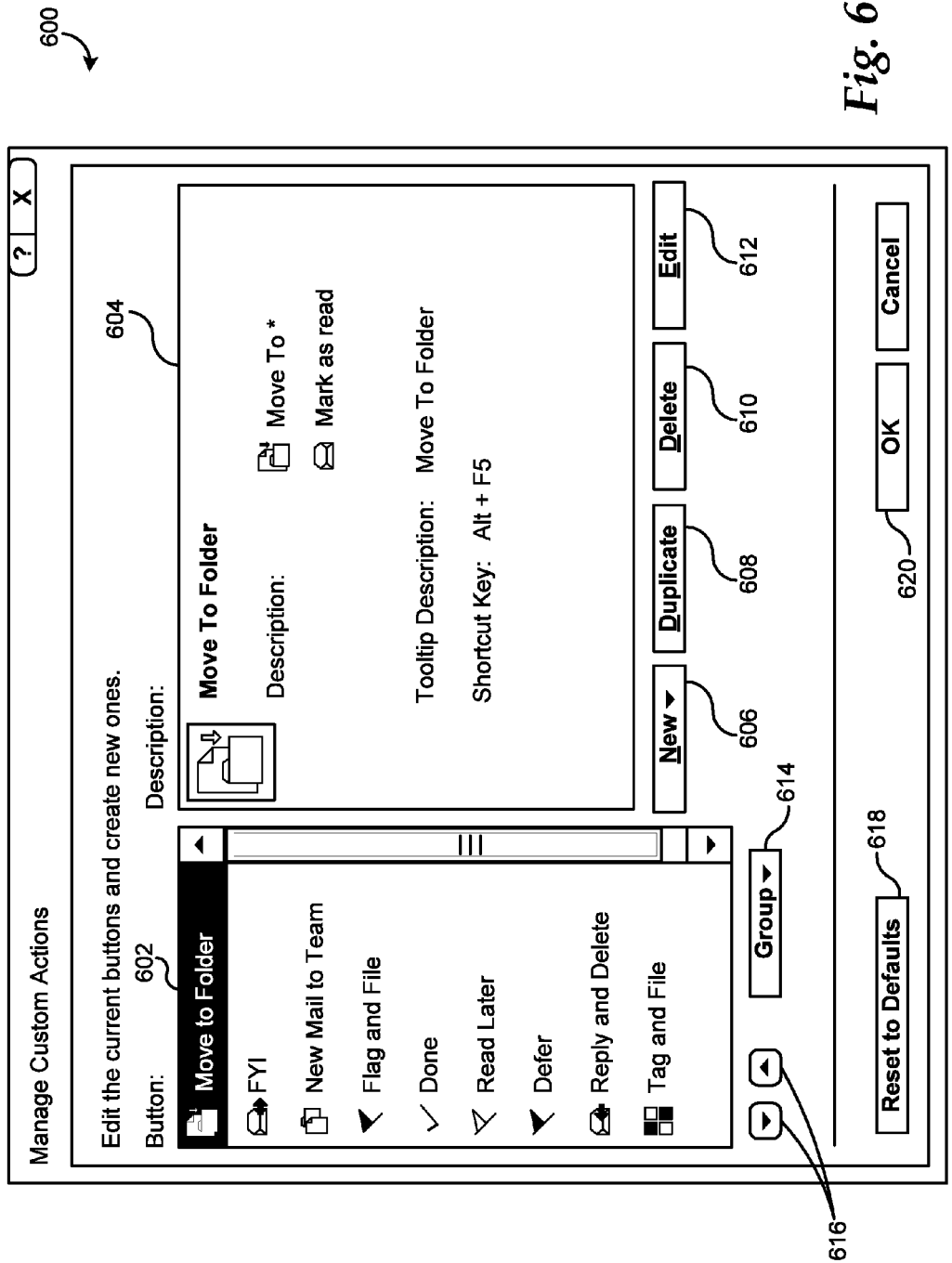
FIG. 6 is a screen diagram showing a manage custom actions dialog according to various embodiments presented herein.

FIG. 6 shows a manage custom actions dialog 600. As mentioned above, according to one implementation, the manage custom actions dialog 600 is launched when the user selects the "Manage Custom Actions" control 316 from the expanded custom actions gallery 300. The manage custom actions dialog 600 may include a custom actions list 602 and a preview 604. The custom actions list 602 lists all of the available custom action controls 102. The user may select a custom action control 102 in the custom actions list 602 to see a preview 604. The preview 604 shows all of the applicable information regarding the selected custom action control 102. For example, the preview 604 of the "Move to Folder" custom action control 102 shows the associated icon, actions, tooltip description, and shortcut key. The tooltip description shows the text that will be displayed for a user when the user hovers a cursor over the custom action control 102. The tooltip description can be added, deleted, and modified using the new/edit dialog described below with respect to FIGS. 7-9.

The custom actions list 602 may show the custom action controls 102 in the order in which they will appear in the expanded custom actions gallery 300. The arrows 616 may be used to move the custom action controls 102 up or down the list to change the corresponding positioning within the expanded custom actions gallery 300. As described above, the custom action controls 102 may be assigned to groups within the expanded custom actions gallery 300 to allow users to organize their custom action controls 102 as they desire. These groups may be created using a control in the "Group" drop-down menu 614. According to one embodiment, the "Group" drop-down menu 614 provides controls for creating a new group, renaming a group, removing a group, sharing a group, and moving groups up and down the list to alter their positions within the expanded custom actions gallery 300.

The "New" drop-down menu 606 provides controls for creating and editing custom action controls 102. The "Duplicate" control 608 creates a duplicate of an existing custom action control 102. The "Delete" control 610 deletes a selected custom action control 102. The "Edit" control 612 launches an edit dialog discussed below with respect to FIG. 8. After making changes using the manage custom actions dialog 600, the user may select the "Reset to Defaults"

control 618 to undo the changes and restore to default settings. When the user is done modifying custom action controls 102 and associated groups, the user may select the "OK" control 620 to save the changes and exit the manage custom actions dialog 600.

Figure 7:
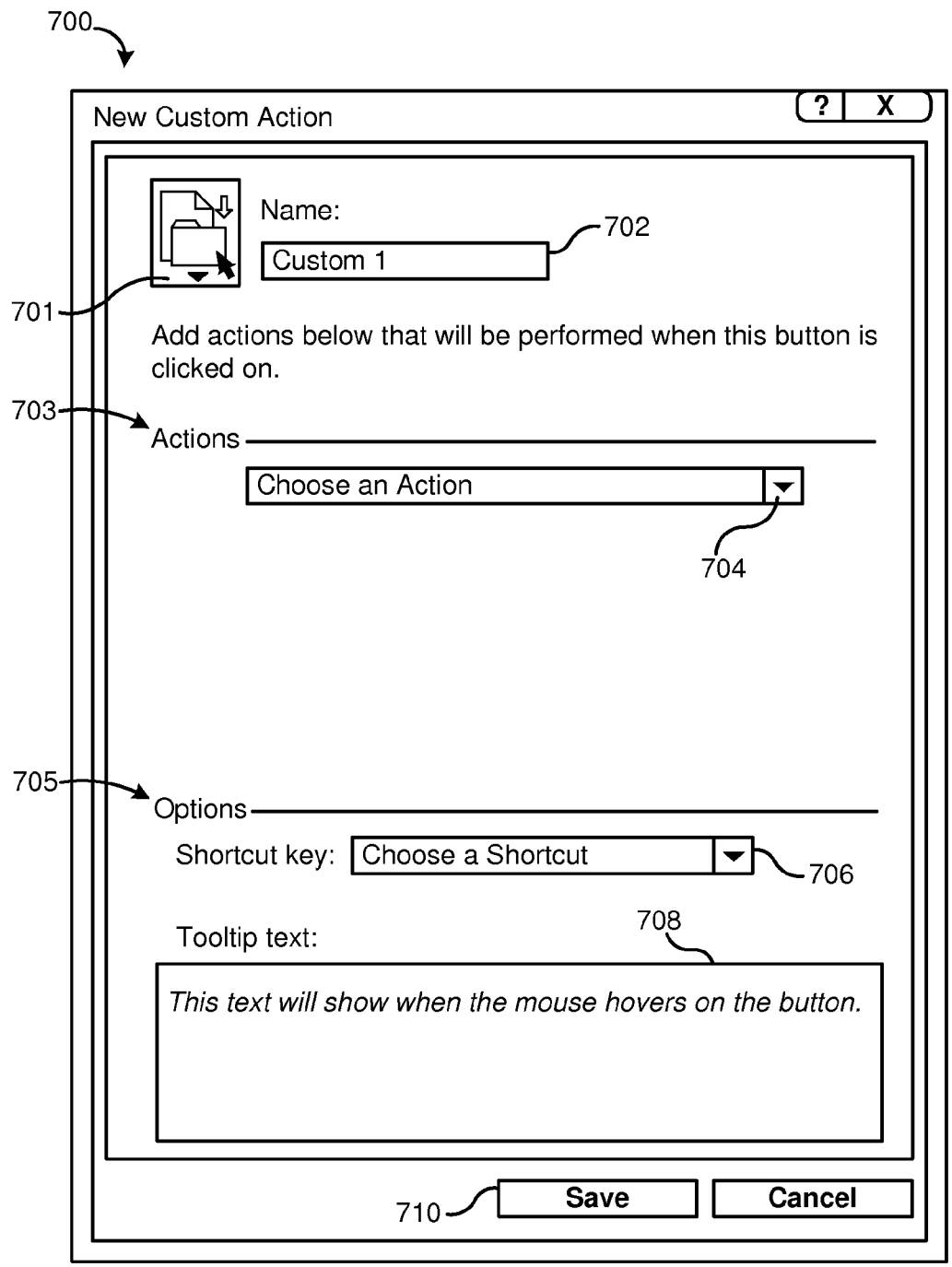
FIG. 7 is a screen diagram showing a new/edit dialog prior to the selection of any action options according to various embodiments presented herein.
Figure 8:
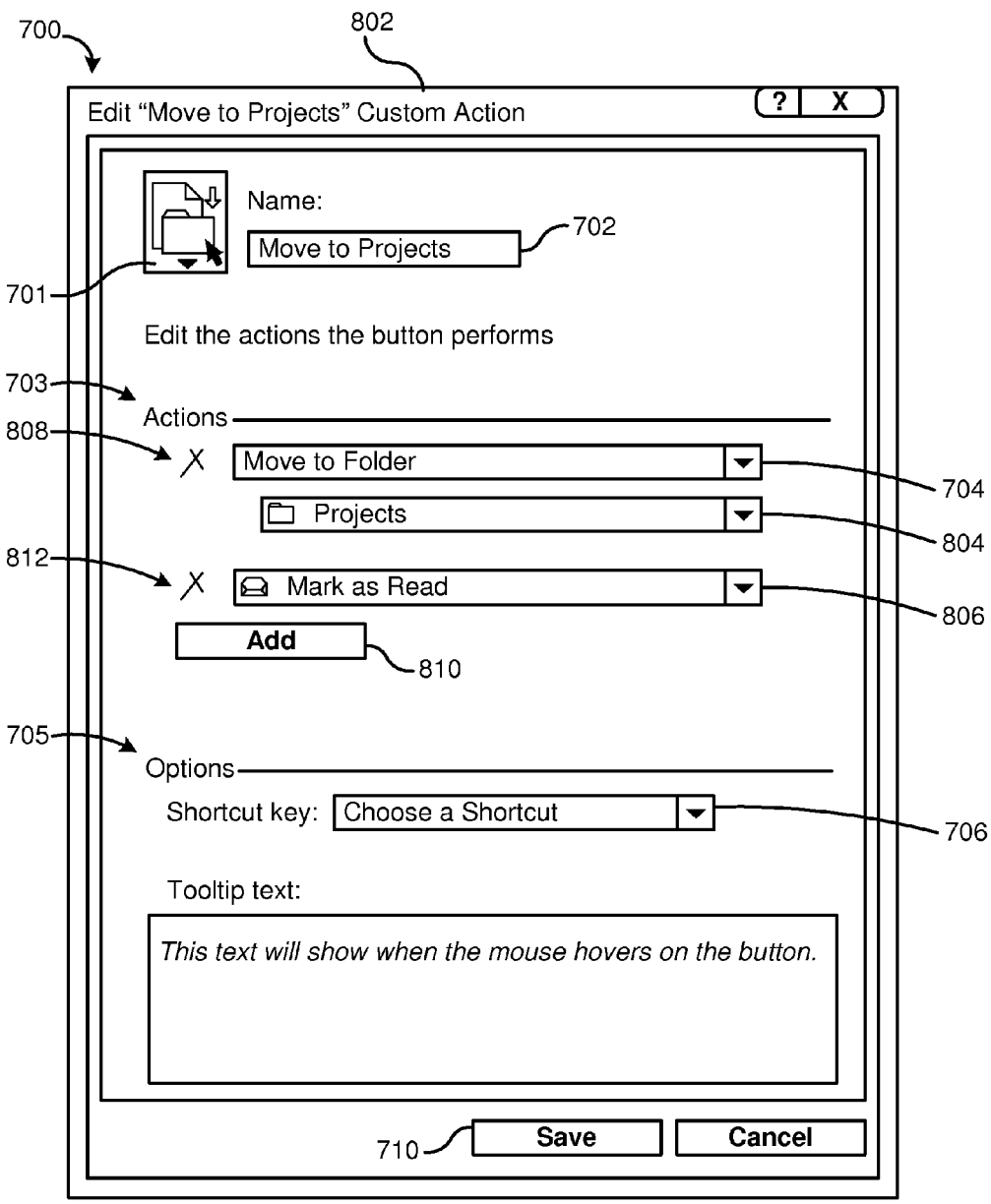
FIG. 8 is a screen diagram showing a new/edit dialog after action options have been selected according to various embodiments presented herein.
Figure 9:
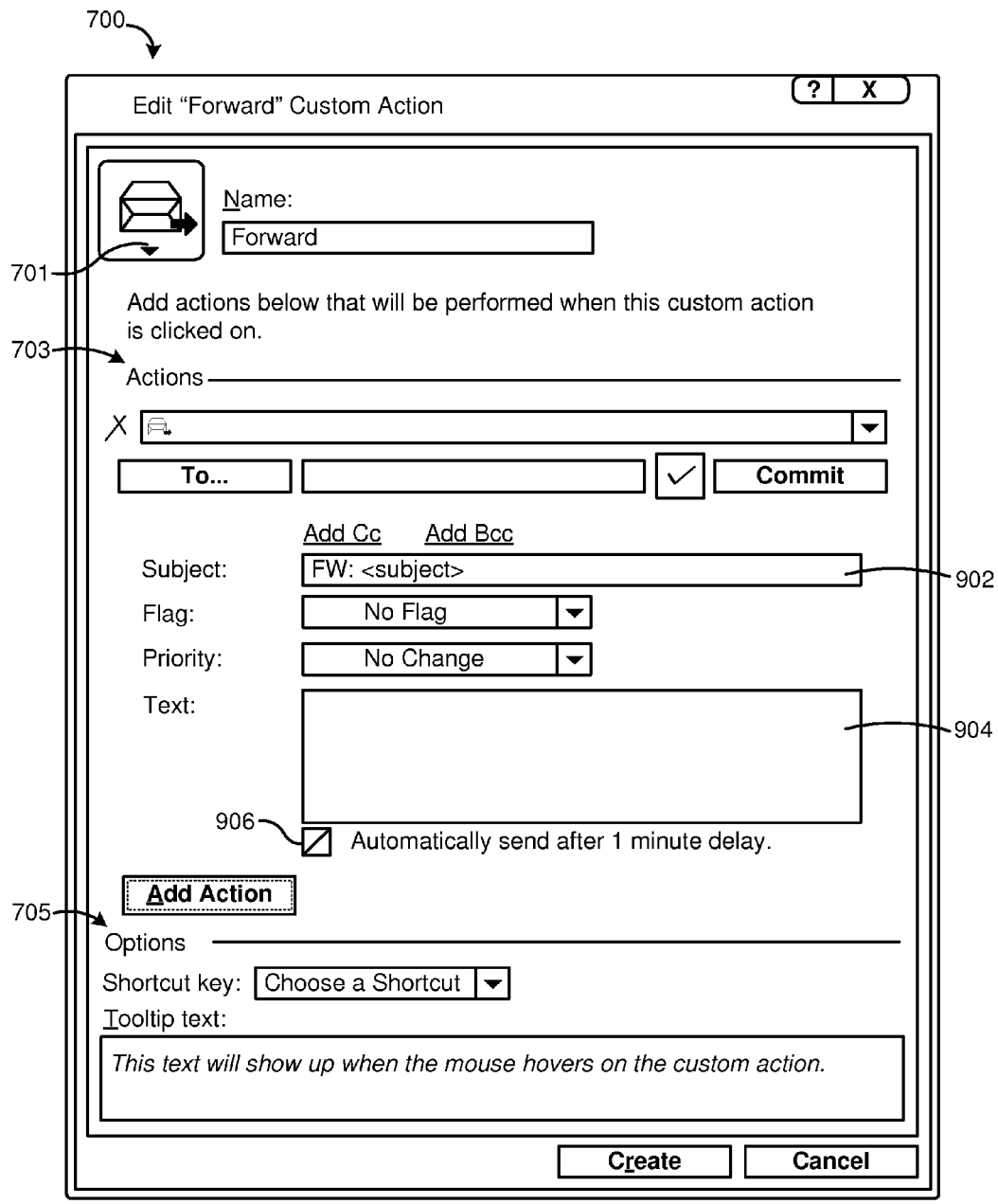
FIG. 9 is a screen diagram showing an alternative example of a new/edit dialog with a field for accepting textual input to include with a response message according to various embodiments presented herein.

Turning to FIGS. 7-9, the new/edit dialog 700 will now be described. A selection of the "Create New Custom Action" control 120 from the custom actions gallery 100 or expanded custom actions gallery 300, or a selection of the "Custom" control 418 in the flyout menu 414 of the expanded custom actions gallery 300, will launch the new/edit dialog 700 shown in FIG. 7. According to one implementation, the new/edit dialog 700 includes an icon selection control 701, a name field 702, a set of actions 703, and one or more options 705. As described above with respect to the template dialog 500, the icon selection control 701 will allow the user to select an icon to be displayed with the newly created custom action control 102 if the user does not want to use the preselected icon that is based on the first action.

The actions 703 are selected using a first action selection drop-down control 704. The options 705 are added to the new custom action control 102 using a shortcut drop-down control 706 and a tooltip text entry field 708. In creating a new custom action control 102, the name for the control will be automatically selected based on the first action selected, as described below. The user may change the selected name by entering a name for the control in the name field 702. The user may then select a first action 703 from the first action selection drop-down control 704. After selecting the first action 703, the user will have an opportunity to select further actions 703.

For example, after naming the new custom action control 102 "Move to Projects" and selecting the first action 703 of "Move to Folder," the new/edit dialog 700 shown in FIG. 8 may be displayed. After selecting the first action 703 corresponding to moving an e-mail to a folder, the user is prompted to designate the folder using the folder designation drop-down control 804. The name of the new custom action control 102 is then prepopulated in the name field 702 and may be changed by the user if desired. The user may select the remove control 808 to delete the selected action 703 or the "Add" control 810 to add a second action 703. After selecting the "Add" control 810, the user is presented with a second action selection drop-down control 806, which is used to select "Mark as Read" as the second action 703 to be performed on the active e-mail. The user may again delete one or more of the actions 703 using the remove controls 808 and 812, or may add a third action 703 by selecting the "Add" control 810.

The user may then select one or more options 705 for inclusion with the custom action control 102. The user can designate a shortcut key or combination of keyboard keys to initiate the associated custom action control 102 by using the shortcut drop-down control 706. Alternatively, the user may enter the desired shortcut into a shortcut key field. The user may also enter a tooltip into the tooltip text entry field 708. As described above, the tooltip text is displayed to the user upon hovering the cursor over the corresponding custom action control 102. After configuring the new custom action control 102, the user may select the "Save" control 710 to save the configuration and create the custom action control 102.

Figure 11:
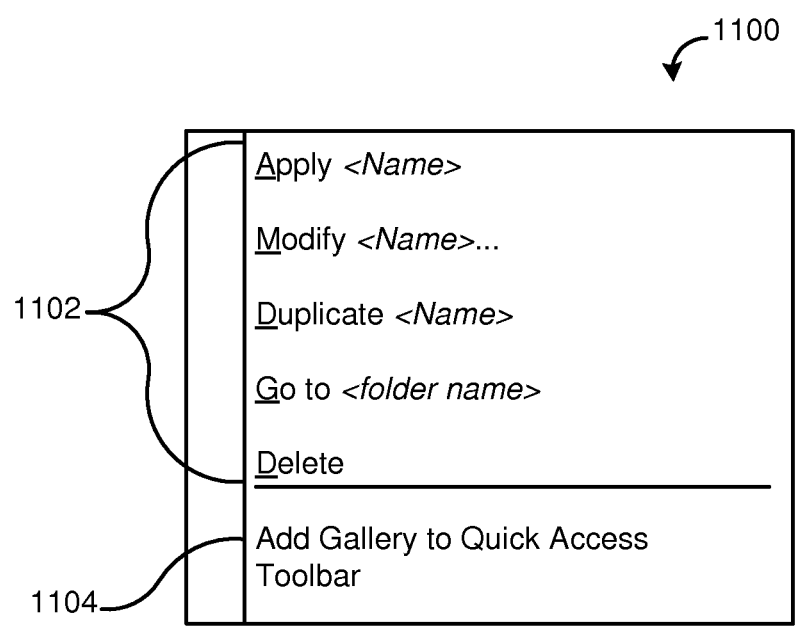
FIG. 11 is a screen diagram showing a right click menu according to various embodiments presented herein.

As discussed, the new/edit dialog 700 shown in FIG. 8 will populate from the clear new/edit dialog 700 shown in FIG. 7 as selections are made. Additionally, the new/edit dialog 700 shown in FIG. 8 will be launched with all appropriate actions 703, options 705, and any other applicable information populated when the "Edit" control 612 or the "Modify" control from the right-click menu described below with respect to FIG. 11 is selected.

FIG. 9 shows an additional example of the new/edit dialog 700. This example illustrates the substantial quantity and complexity of the actions 703 that may be assigned to a custom action control 102 according to the concepts presented herein. In this example, the user has created a custom action control 102 to forward an e-mail to one or more people. The forwarded e-mail may go to any number of recipients, including copies and blind copies. The forwarded e-mail may be flagged and assigned a priority. The subject of the forwarded e-mail may be populated with the text entered into a subject field 902 of the new/edit dialog 700. Text may also be entered into a text field 904 of the new/edit dialog 700, which will then be included within the body of the forwarded e-mail. The check box 906 may be selected to assign a pre-determined or user-selected delay to the forwarding action.

Using these concepts, for example, the user may configure a custom action control 102 to automatically forward the active e-mail to a team of people, with the subject "Review and Advise" and text within the body of the e-mail that states, "Please review the issue below and respond within suggestions within 24 hours." It should be clear from this example and others throughout this disclosure that the embodiments described herein may significantly improve a user's efficiency in handling e-mails and enhance the overall experience associated with an e-mail or other messaging application.

Figure 10:
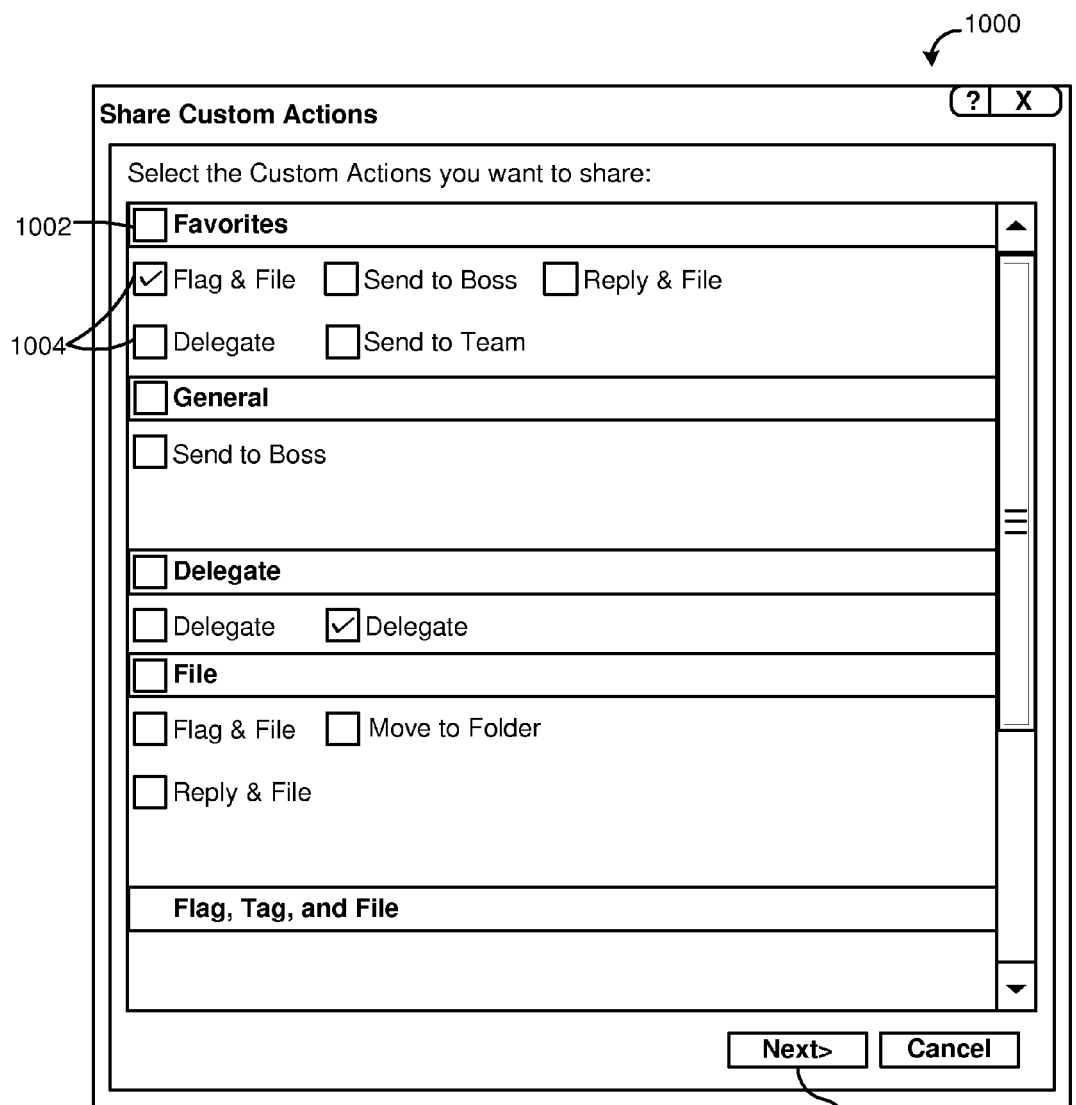
FIG. 10 is a screen diagram showing a share custom actions dialog according to various embodiments presented herein.

Referring now to FIG. 10, a share dialog 1000 will be described. The share dialog 1000 is launched from the "Share Custom Actions" control 318 within the expanded custom actions gallery 300 or located in any other menu. The share dialog 1000 allows the user to select which custom action controls 102 or groups of custom action controls 102 are to be shared with other users. Embodiments of the disclosure presented herein allow for custom action controls 102 to be saved to a file or exported via e-mail. The recipient may then import the custom action controls 102 to be used in the e-mail application executing on his or her computer.

The share dialog 1000 includes checkboxes 1002 corresponding to group selections and checkboxes 1004 corresponding to individual custom action controls 102. Checking a checkbox 1002 corresponding to a group will check all of the checkboxes 1004 for that group. After selecting the desired custom action controls 102 and groups for sharing, the user selects the "Next" control 1006 to launch a dialog requesting a choice of sending the custom action controls 102 via e-mail or saving them to a file. If the user chooses to send the custom action controls via e-mail, then an e-mail message is displayed with the selected custom action controls 102 attached as an extensible markup language (XML) attachment. The XML attachment with the shared custom action controls 102 may be imported by the e-mail application on the recipient computer. It should be appreciated that sharing the custom action controls 102 via e-mail is not limited to XML. Rather, any appropriate language may be used to transfer the custom action controls 102 between e-mail applications on remote computers.

As stated above, the disclosure provided herein additionally provides for roaming of the custom action controls 102 between multiple e-mail applications that are communicatively linked, such as those communicating via an Exchange server. The custom action controls 102 may be stored per messaging account and only available in the account that they were created in, or they may be stored in a single location that is accessible across accounts, depending on the account type. In this manner, a user may utilize the same custom action controls 102 on multiple computers in communication with a server on a network.

FIG. 11 shows a right-click menu 1100 according to one embodiment of the disclosure provided herein. The right-click menu 1100 is displayed when the user right clicks a mouse or presses a corresponding combination of keyboard keys when a custom action control 102 is selected. The right-click menu 1100 includes a number of commands 1102, which perform various actions with respect to the selected custom action control 102. According to the implementation shown in FIG. 11, the commands 1102 include, but are not limited to, applying the selected custom action control 102 to an active e-mail, launching the new/edit dialog 700 to modify the custom action control 102, duplicating the custom action control 102, taking the user to a folder if the custom action control 102 includes a folder action, and deleting the custom action control 102. The right-click menu 1100 may additionally include a command 1104 for adding the gallery containing the custom action control 102 to a toolbar. It should be appreciated that any number and type of commands 1102 may be included within the right-click menu 1100.

Figure 12:
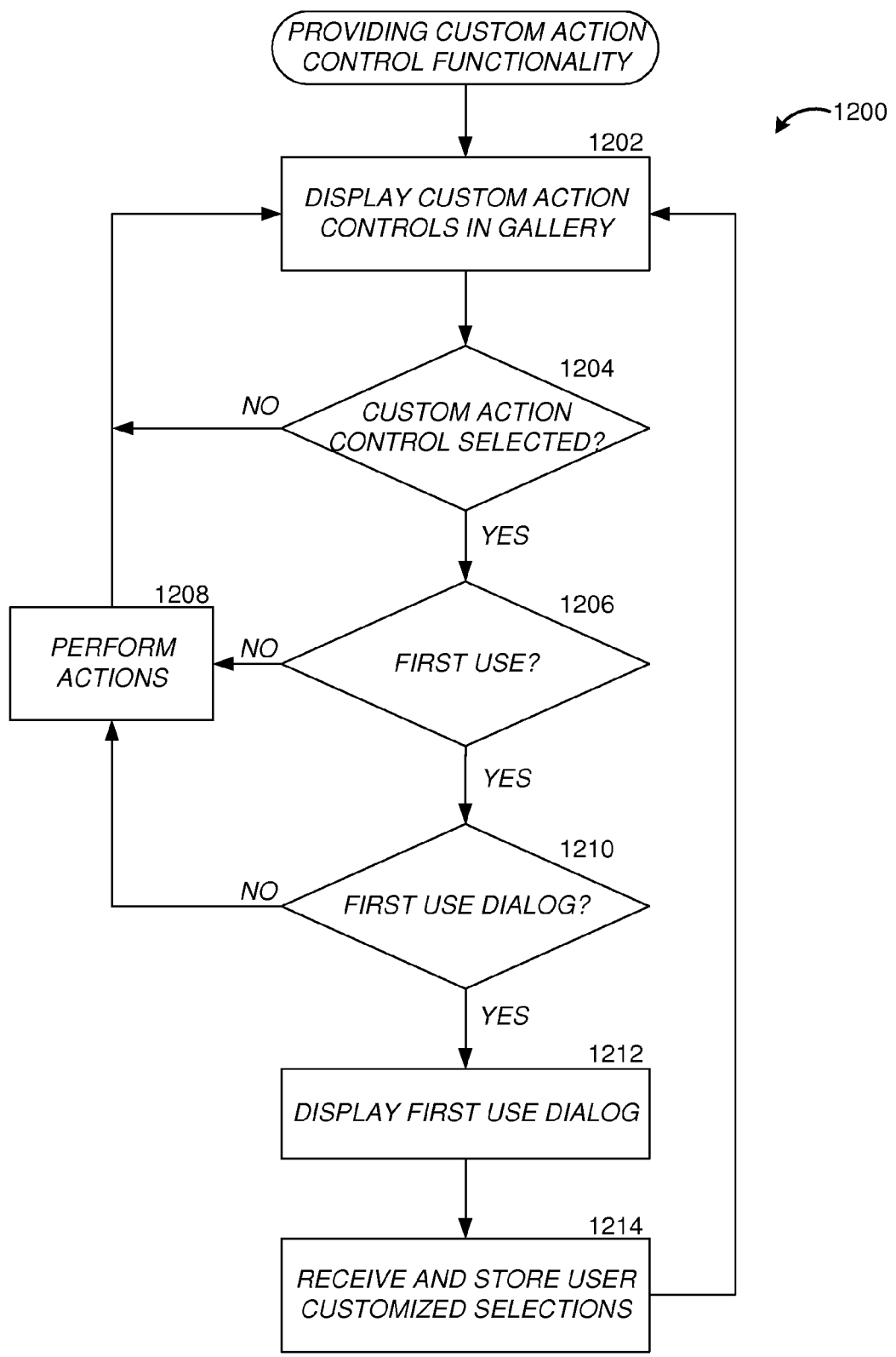
FIG. 12 is a flow diagram showing an illustrative process for providing custom actions control functionality according to various embodiments presented herein.

Turning now to FIG. 12, a flow diagram illustrating aspects of a routine 1200 performed by an e-mail application to provide users with the ability to perform multiple actions 703 on an e-mail, contact, task, calendar item, or other actionable item provided by a messaging application with a single click of a mouse or utilization of a shortcut key on a keyboard. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 1200 begins at operation 1202, where the e-mail application displays any number of custom action controls 102 in a gallery. As described above, the custom action controls 102 may be default controls, customized controls, or a combination of the two. The custom action controls 102 may be provided in the custom actions gallery 100 adjacent to a window displaying an active e-mail, or in any other gallery or menu. From operation 1202, the routine 1200 continues to operation 1204, where the e-mail application determines whether a custom action control 102 has been selected. If not, the routine 1200 returns to operation 1202 and continues until a custom action control 102 has been selected. When a custom action control 102 has been selected, the routine 1200 continues to operation 1206, where the e-mail application determines whether the selected custom action control 102 has ever been selected. If the custom action control 102 has been previously selected, then the routine 1200 proceeds to operation 1208, where the actions 703 assigned to the custom action control 102 are performed. The routine 1200 returns to operation 1202 and proceeds as described above.

However, if at operation 1206, the e-mail application determines that the custom action control 102 is being used for the first time, then the routine 1200 continues to operation 1210, where the e-mail application determines whether a first use dialog 200 will be displayed. As described above, a first use dialog 200 may be displayed when the custom action control 102 includes one or more of the actions 703 with multiple options in which one is to be selected as a default. As an example, a default folder is to be designated via the first use dialog 200 for an action that includes moving the active e-mail to a folder.

If a first use dialog 200 will not be displayed, then the routine 1200 proceeds to operation 1208 and continues as described above. However, if a first use dialog 200 will be displayed, then the routine 1200 continues to operation 1212, where the e-mail application displays the appropriate first use dialog 200. At operation 1214, the e-mail application receives and stores the user-customized selections input into via the first use dialog 200. The routine 122 then returns to operation 1202 and continues as described above.

Figure 13:
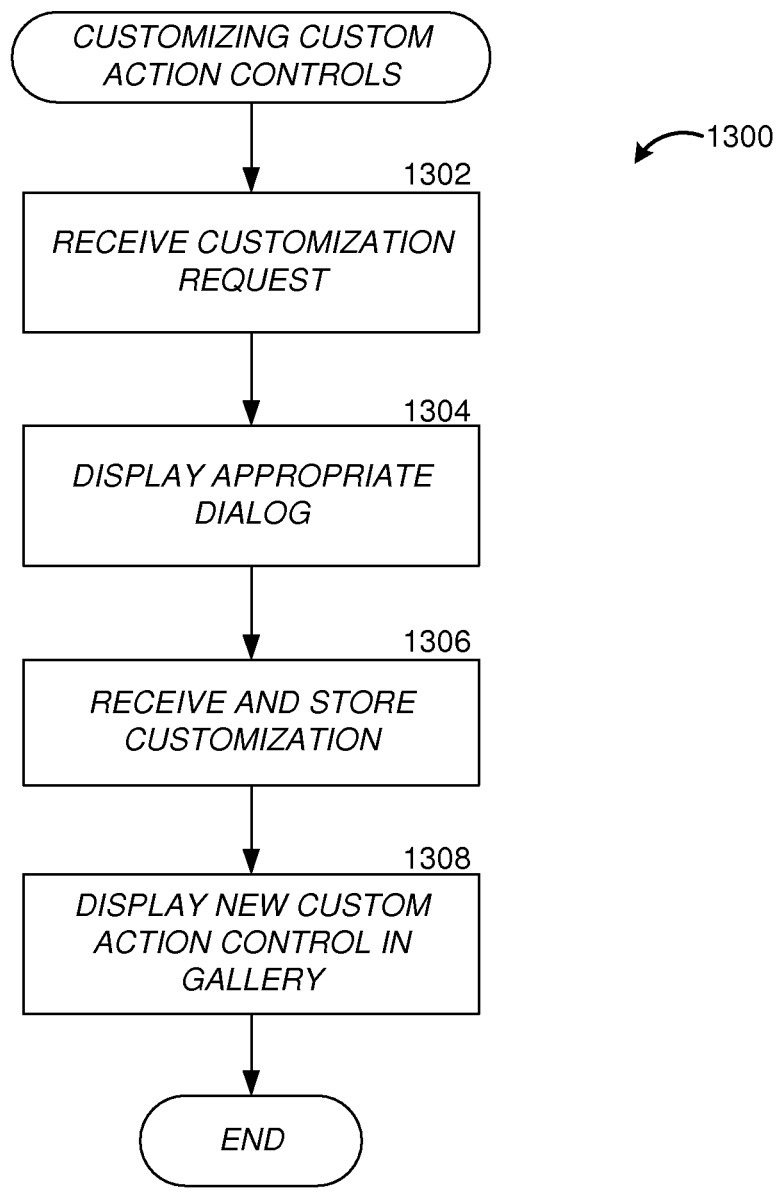
FIG. 13 is a flow diagram showing an illustrative process for configuring custom action controls according to various embodiments presented herein.

FIG. 13 shows a routine 1300 for customizing a custom action control 102. The routine 1300 begins at operation 1302, where the e-mail application receives a customization request. This request may be received via a user selection of an appropriate control discussed above for creating a new custom action control 102 or modifying an existing custom action control 102. From operation 1302, the routine 1300 continues to operation 1304, where the e-mail application displays the appropriate dialog. This dialog may be the first use dialog 200, the new/edit dialog 700, or a template dialog 500. The e-mail application receives input from the user via the displayed dialog and associates the input with the new or modified custom action control 102 at operation 1306. From operation 1306, the routine 1300 continues to operation 1308, where the e-mail application displays the new or modified custom action control 102 in the custom actions gallery 100 or expanded custom actions gallery 300, and the routine 1300 ends.

Figure 14:
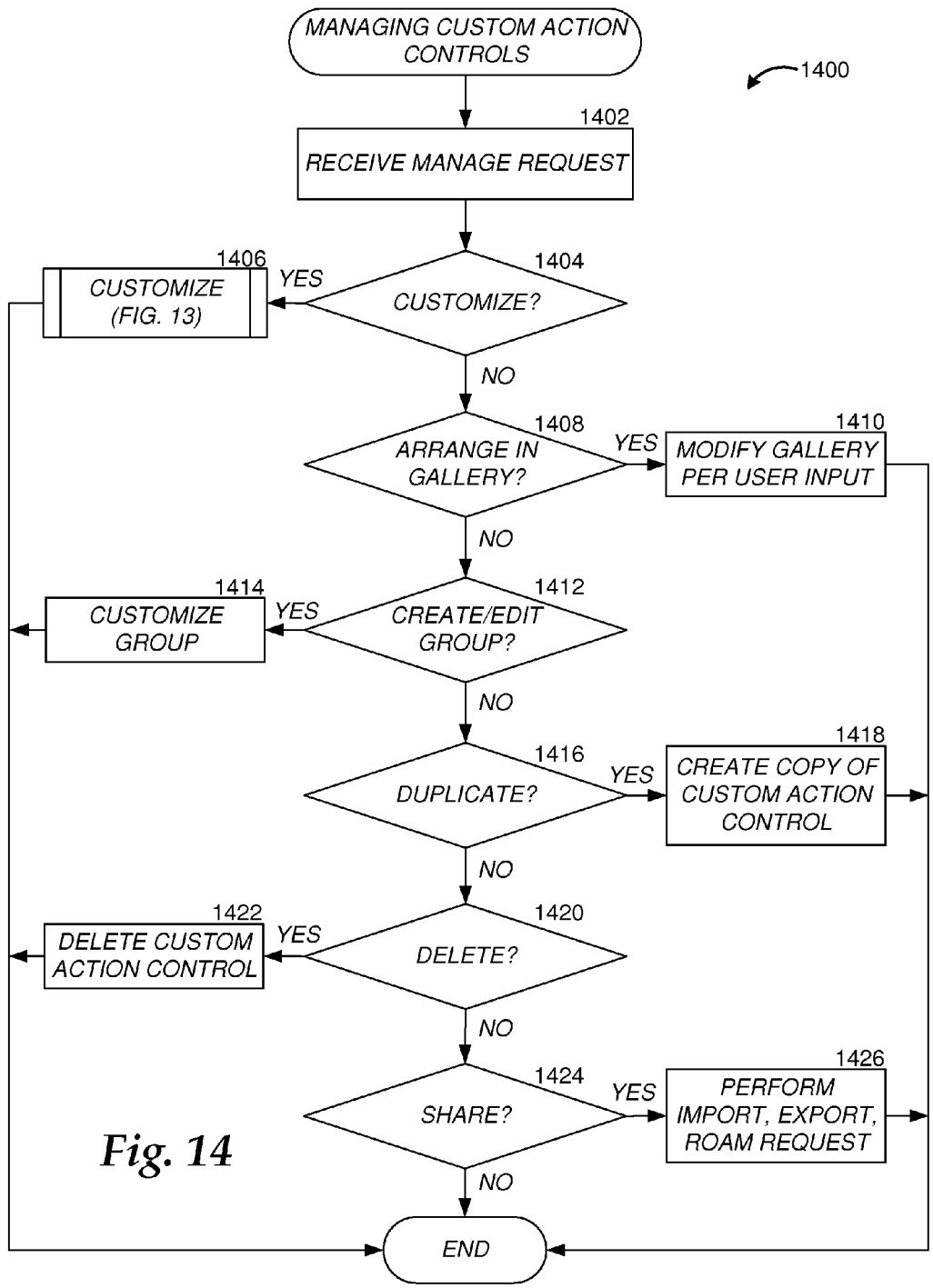
FIG. 14 is a flow diagram showing an illustrative process for managing custom action controls according to various embodiments presented herein.

FIG. 14 illustrates a routine 1400 for managing custom action controls 102 according to the embodiments described above. The routine 1400 begins at operation 1402, where the e-mail application receives a manage request from the user. The manage request may be received via a selection of the "Create New Custom Action" control 120 from the custom actions gallery 100, a selection of any template control 416 from the flyout menu 414 triggered by the selection of the "New Custom Action" control 314 in the expanded custom actions gallery 300, a selection of the "Manage Custom Actions" control 316 from the expanded custom actions gallery 300, a selection of the "Share Custom Actions" control 318 from the expanded custom actions gallery 300, a selection of most controls within the manage custom actions dialog 600, or a selection of any of the commands 1102 in the right-click menu 1100. It should be appreciated that the routine 1400 shown in FIG. 14 is for illustrative purposes only and does not include every contemplated management action according to the disclosure presented herein.

The routine 1400 begins at operation 1402, where the e-mail application receives a manage request. This request may be received via any number and type of controls as described above. From operation 1402, the routine 1400 continues to operation 1404, where the e-mail application determines whether the request is a request to create or edit a custom action control 102. If the request is a request to customize a custom action control 102, then the routine proceeds to operation 1406, where the e-mail application customizes the custom action control 102 per the user's request. This customization process is described above with respect to FIG. 13. From operation 1406, the routine 1400 ends.

If the e-mail application determines at operation 1404 that the request is not a request to customize a custom action control 102, then the routine 1400 continues to operation 1408, where the e-mail application determines whether the manage request is a request to arrange the order and placement of the custom action controls 102 within the custom actions gallery 100 or expanded custom actions gallery 300. This request may be received from a selection of arrows 616 in the manage custom actions dialog 600. If the request is for organizing the gallery, then the routine 1400 modifies the gallery accordingly at operation 1410 and the routine 1400 ends. However, if the manage request is not for organizing the gallery, then the routine proceeds from operation 1408 to operation 1412, where the e-mail application determines whether the manage request is to create or edit a group of custom action controls 102. This request may be received from a selection from the "group" drop-down menu 614 of the manage custom actions dialog 600. If the request is to create or edit a group of custom action controls 102, then the e-mail application customizes a group according to the request at operation 1414 and the routine 1400 ends.

However, if at operation 1412, it is determined that the request is not to create or edit a group, then the routine 1400 continues to operation 1416, where the e-mail application determines whether the request is to duplicate a custom action control 102. This request may be received from a selection of the "Duplicate" control 608 of the manage custom actions dialog 600 or from a command 1102 of the right-click menu 1100. If the request is to duplicate a custom action control 102, then the routine 1400 proceeds to operation 1418, where a copy of the custom action control 102 is made and the routine 1400 ends. If the e-mail application determines at operation 1416 that the manage request is not a request to duplicate a custom action control 102, then the routine 1400 continues to operation 1420, where the e-mail application determines whether the request is to delete a custom action control 102. This request may be received from a selection of the "Delete" control 610 of the manage custom actions dialog 600 or from a command 1102 of the right-click menu 1100.

If it is determined that the manage request is to delete a custom action control 102, then the routine 1400 proceeds to operation 1422, where the custom action control 102 is deleted and the routine 1400 ends. If the e-mail application determines at operation 1420 that the manage request is not a request to delete a custom action control 102, then the routine 1400 continues to operation 1424, where the e-mail application determines whether the request is to share a custom action control 102 or group of custom action controls 102 with another user or another computer. This request may be received from a selection of the "Share Custom Actions" control 318 of the expanded custom actions gallery 300. If the manage request is not a request to share custom action controls 102, then the routine 1400 ends. However, if the manage request is determined to be a request to share custom action controls 102, then the routine 1400 proceeds to operation 1426, where requested import, export, or roaming actions are performed in the manner described above and the routine 1400 ends.

Figure 15:
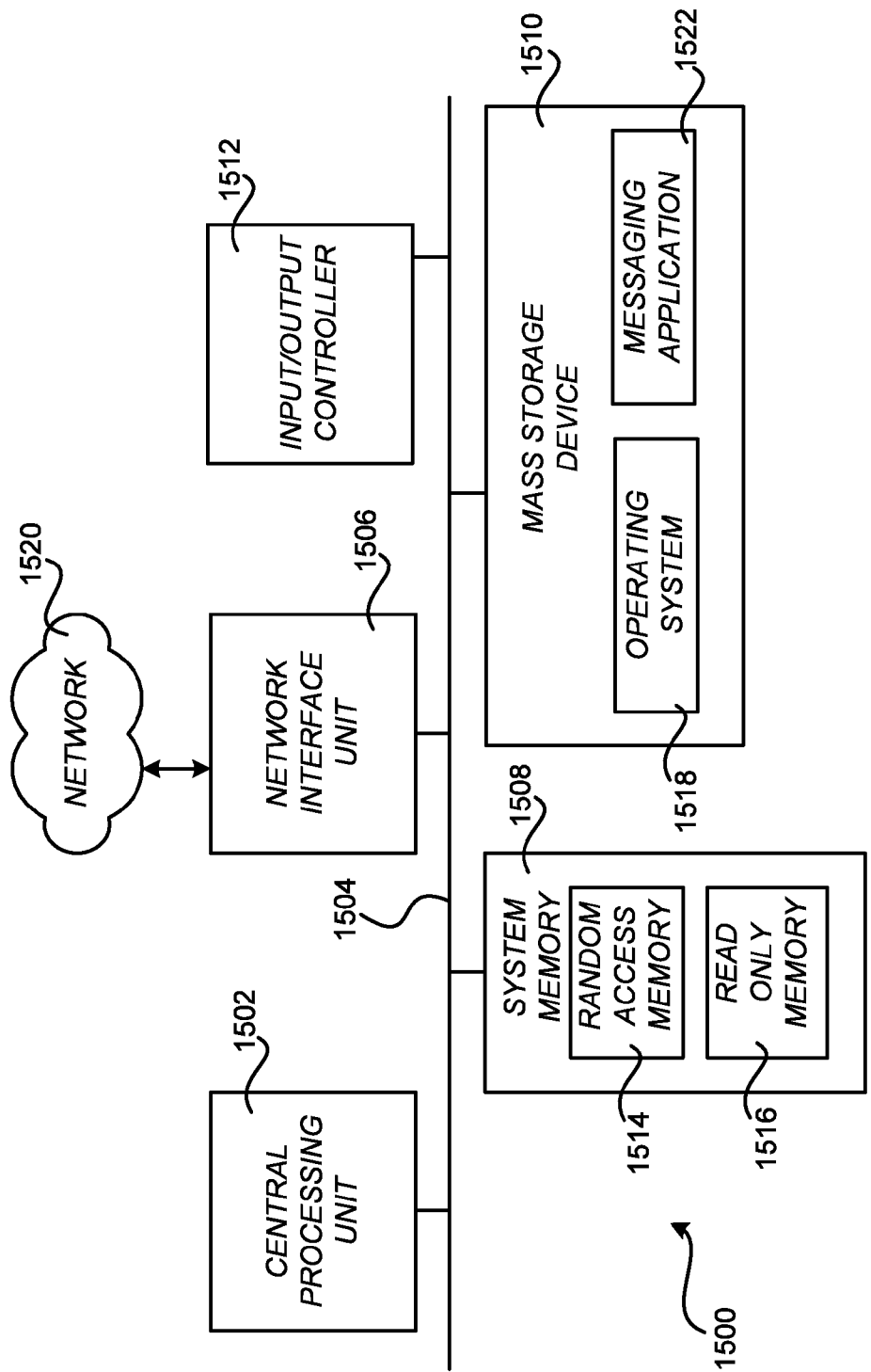
FIG. 15 is a computer architecture diagram showing an illustrative computer hardware and software architecture for a computing system capable of implementing aspects of the embodiments presented herein.

FIG. 15 shows an illustrative computer architecture for a computer 1500 capable of executing the software components described herein for providing custom action controls 102 and the corresponding functionality in the manner presented above. The computer architecture shown in FIG. 15 illustrates a conventional desktop, laptop, or server computer and may be utilized to embody any aspects of the software components presented herein.

The computer architecture shown in FIG. 15 includes a central processing unit 1502 (CPU), a system memory 1508, including a random access memory 1514 (RAM) and a read-only memory (ROM) 1516, and a system bus 1504 that couples the memory to the CPU 1502. A basic input/output system containing the basic routines that help to transfer information between elements within the computer 1500, such as during startup, is stored in the ROM 1516. The computer 1500 further includes a mass storage device 1510 for storing an operating system 1518, application programs, and other program modules, which are described in greater detail herein.

The mass storage device 1510 is connected to the CPU 1502 through a mass storage controller (not shown) connected to the bus 1504. The mass storage device 1510 and its associated computer-readable media provide non-volatile storage for the computer 1500. Although the description of computer-readable media contained herein refers to a mass storage device, such as a hard disk or CD-ROM drive, it should be appreciated by those skilled in the art that computer-readable media can be any available computer storage media that can be accessed by the computer 1500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 1500.

According to various embodiments, the computer 1500 may operate in a networked environment using logical connections to remote computers through a network such as the network 1520. The computer 1500 may connect to the network 1520 through a network interface unit 1506 connected to the bus 1504. It should be appreciated that the network interface unit 1506 may also be utilized to connect to other types of networks and remote computer systems. The computer 1500 may also include an input/output controller 1512 for receiving and processing input from a number of other devices, including a keyboard, mouse, or electronic stylus (not shown in FIG. 15). Similarly, an input/output controller may provide output to a display screen, a printer, or other type of output device (also not shown in FIG. 15).

As mentioned briefly above, a number of program modules and data files may be stored in the mass storage device 1510 and RAM 1514 of the computer 1500, including an operating system 1518 suitable for controlling the operation of a networked desktop, laptop, or server computer. The mass storage device 1510 and RAM 1514 may also store one or more program modules. In particular, the mass storage device 1510 and the RAM 1514 may store a messaging application 1522, such as the e-mail application described in detail above with respect to FIGS. 1-14. The mass storage device 1510 and the RAM 1514 may also store other types of program modules.

Based on the foregoing, it should be appreciated that technologies for providing users with easily customizable controls for performing multiple actions on a message with a single mouse click or press of a key on a keyboard are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
    receiving, by an e-mail application, a request to create a new custom action control;
    in response to the request to create the new custom action control, providing, by the e-mail application, a graphical user interface ("GUI") dialog template comprising a plurality of action options corresponding to actions to be taken with respect to a designated active message upon selection of the new custom action control;
    receiving, by the e-mail application, a selection of at least two action options to be taken with respect to the designated active message, the at least two action options indicated in the GUI dialog template;
    associating, by the e-mail application, the new custom action control with the at least two action options selected from the GUI dialog template such that a subsequent selection of the new custom action control initiates actions corresponding to the at least two action options;
    selecting, by the e-mail application, an email message as the designated active message;
    providing, by the e-mail application, on a GUI the new custom action control comprising an icon corresponding to the at least two action options to be performed with respect to the designated active message;
    receiving, by the e-mail application, a single user input comprising a selection of the new custom action control;
    in response to receiving the selection of the new custom action control, performing, by the e-mail application, the at least two action options with respect to the designated active message; and
    providing, by the e-mail application, the new custom action control to a network server configured to provide the new custom action control to one or more other instances of the e-mail application.

2. The method of claim 1, wherein providing the new custom action control comprises providing the new custom action control in a gallery on the GUI adjacent to a message window comprising the designated active message.

3. The method of claim 1, wherein the GUI dialog template further comprises a text entry field for receiving text to be displayed when a mouse hovers over the new custom action control and an icon control for selecting an icon from a plurality of icons to be associated with the new custom action control.

4. The method of claim 2, wherein the gallery comprises a quantity of custom action controls fewer than a total number of available custom action controls and wherein the gallery further comprises an expand control that when selected, is operative to expand the gallery to display all of the available custom action controls.

5. The method of claim 4, wherein the gallery is configured to group custom action controls into categories when expanded.

6. The method of claim 1, further comprising:
    receiving, by the e-mail application, a right-click selection of the new custom action control; and
    in response to receiving the right-click selection of the new custom action control, providing, by the e-mail application, a menu comprising a plurality of commands corresponding to the new custom action control, the plurality of commands comprising a command to apply the new custom action control to the designated active message and a command to modify the new custom action control.

7. One of an optical disk, a magnetic storage device or a solid state storage device having computer executable instructions stored thereon which, when executed by a computer, cause the computer to:
    receive, by an e-mail application, a request to customize a custom action control for performing actions on a subsequently selected email message;
    in response to the request to customize the custom action control, provide, by the e-mail application, a dialog template for display on a graphical user interface comprising a plurality of selectable actions corresponding to actions to be taken upon the subsequently selected email message upon selection of the custom action control;
    receive, by the e-mail application, a selection of at least two actions to be taken with respect to the subsequently selected email message, the at least two actions indicated in the dialog template;
    associate, by the e-mail application, the custom action control with the at least two actions selected such that a subsequent selection of the custom action control initiates the at least two actions on the subsequently selected email message;
    provide, by the e-mail application, the custom action control comprising an icon for display on the graphical user interface in a gallery adjacent to a message window comprising an active message;
    receive, by the e-mail application, a selection of the custom action control;
    in response to receiving the selection of the custom action control, perform, by the e-mail application, the at least two actions associated with the custom action control; and
    provide, by the e-mail application, the custom action control to a network server configured to provide the custom action control to one or more other instances of the e-mail application.

8. The optical disk, magnetic storage device or solid state storage device of claim 7, wherein the request to customize the custom action control comprises a type of custom action control, and wherein the dialog template is configured according to the type of custom action control requested.

9. The optical disk, magnetic storage device or solid state storage device of claim 7, wherein the dialog template further comprises a text entry field for receiving text to be displayed when a mouse hovers over the custom action control and a shortcut key field for receiving a keyboard shortcut key identification corresponding to a combination of keyboard keys to be assigned to the custom action control.

10. The optical disk, magnetic storage device or solid state storage device of claim 7, wherein the request to customize the custom action control comprises a request to create a new custom action control.

11. The optical disk, magnetic storage device or solid state storage device of claim 7, wherein the request to customize the custom action control comprises a request to edit an existing custom action control.

12. The optical disk, magnetic storage device or solid state storage device of claim 7, further comprising computer executable instructions stored thereon which, when executed by a computer, cause the computer to:
  determine, by the e-mail application, that the request to customize the custom action control comprises a request to transmit an email message to a recipient having a title;
  retrieve, by the e-mail application, an address corresponding to the title of the recipient from a global address book; and
  pre-populate, by the e-mail application, a field of the dialog template corresponding to the address with the address retrieved from the global address book.

13. A system comprising:
  a memory that stores computer executable instructions thereon; and
  a computer processor that executes the stored computer executable instructions in the memory causing the computer processor to,
    display, by an e-mail application, a gallery on a graphical user interface ("GUI") comprising a plurality of custom action controls each comprising an icon adjacent to a message window comprising an active message, the active message comprising a selected email message, each custom action control defining a plurality of actions previously indicated to be taken with respect to the active message,
    provide, by the e-mail application, a manage custom actions control with the gallery,
    receive, by the e-mail application, a selection of the manage custom actions control,
    in response to receiving the selection of the manage custom actions control, provide, by the e-mail application, a manage custom actions dialog template comprising a preview of each of the plurality of custom action controls and a plurality of selectable controls for modifying at least one of the plurality of custom action controls within the gallery,
    receive, by the e-mail application, a control selection corresponding to a desired modification of at least one of the plurality of custom action controls within the gallery,
    in response to receiving the control selection, modify, by the e-mail application, the at least one of the plurality of custom action controls according to the control selection, and
    provide, by the e-mail application, the custom action control to a network server configured to provide the custom action control to one or more other instances of the e-mail application.

14. The system of claim 13, wherein a selectable control for modifying at least one of the plurality of custom action controls within the gallery comprises a sharing control operative to provide one or more of the plurality of custom action controls to the network server.

15. The method of claim 1, further comprising:
  importing, by a second instance of the e-mail application, the new custom control based on providing the new custom action control to the network server; and
  using the new custom control in the second instance of the e-mail application.

16. The optical disk, magnetic storage device or solid state storage device of claim 7, wherein the computer executable instructions when executed by a second computer, cause the second computer to
  import, by a second instance of the e-mail application, the custom control based on providing the custom action control to the network server; and
  use the custom control in the second instance of the e-mail application executing on the second computer.

17. The system of claim 13, wherein the stored computer executable instructions further cause a second computer processor to:
  import, by a second instance of the e-mail application, the custom control based on providing the new custom action control to the network server; and
  use the custom control in the second instance of the e-mail application executing on the second computer.

* * * * *